(12) United States Patent
Pham

(10) Patent No.: US 11,373,420 B2
(45) Date of Patent: Jun. 28, 2022

(54) METHODS AND SYSTEMS FOR IMPROVING HUMAN HAIR AND SCALP USING VEHICLE CAMERAS AND BIG DATA AI ANALYTICS

(71) Applicant: Toyota Motor Engineering & Manufacturing North America, INC., Plano, TX (US)

(72) Inventor: Alexander T. Pham, San Jose, CA (US)

(73) Assignee: Toyota Motor Engineering & Manufacturing North America, INC., Plano, TX (US)

(*) Notice: Subject to any disclaimer, the term of this patent is extended or adjusted under 35 U.S.C. 154(b) by 126 days.

(21) Appl. No.: 16/857,949

(22) Filed: Apr. 24, 2020

(65) Prior Publication Data

US 2021/0334561 A1    Oct. 28, 2021

(51) Int. Cl.
*G06V 20/59* (2022.01)
*A61Q 5/00* (2006.01)
(Continued)

(52) U.S. Cl.
CPC .............. *G06V 20/59* (2022.01); *A61Q 5/002* (2013.01); *B60W 40/08* (2013.01);
(Continued)

(58) Field of Classification Search
CPC ............ G06K 9/00832; G06F 16/2465; A61Q 5/002; B60W 40/08; B60W 2040/0809;
(Continued)

(56) References Cited

U.S. PATENT DOCUMENTS

| 6,793,242 B2 | 9/2004 | Breed et al. |
| 2014/0028822 A1* | 1/2014 | Khadavi ................ A61B 5/448 348/77 |

(Continued)

FOREIGN PATENT DOCUMENTS

WO    WO 2018/009219 A1    1/2018

OTHER PUBLICATIONS

Harvard Health Publishing ; Treating female pattern hairloss ; Nov. 14, 2018 ; 3 Pages.

(Continued)

*Primary Examiner* — Mohamed Barakat
(74) *Attorney, Agent, or Firm* — Oblon, McClelland, Maier & Neustadt, L.L.P.

(57) ABSTRACT

Hair loss/gain and scalp changes are monitored using vehicle cameras and sensors of connected vehicles. Each vehicle is equipped with at least one camera which images the hair and scalp of a person riding in the vehicle. Each vehicle is operatively connected to a hair and scalp improvement application in a computing cloud which includes a registration module which registers each vehicle. Additionally, the person may register with the hair and scalp improvement application to have his/her hair and scalp analyzed when travelling in any of the registered vehicles. The hair and scalp improvement application is operatively connected to a hair and scalp data artificial intelligence (AI) analytics module and a data lake to search and analyze information related to the changes in the hair and scalp images. A hair and scalp treatment recommendation is transmitted to the person.

20 Claims, 15 Drawing Sheets

US 11,373,420 B2
Page 2

(51) Int. Cl.
 *B60W 40/08* (2012.01)
 *H04L 9/30* (2006.01)
 *G06F 16/2458* (2019.01)

(52) U.S. Cl.
 CPC ............ *G06F 16/2465* (2019.01); *H04L 9/30* (2013.01); *B60W 2040/0809* (2013.01); *B60W 2040/0872* (2013.01); *B60W 2040/0881* (2013.01)

(58) Field of Classification Search
 CPC .. B60W 2040/0872; B60W 2040/0881; H04L 9/30
 See application file for complete search history.

(56) References Cited

U.S. PATENT DOCUMENTS

| | | | | |
|---|---|---|---|---|
| 2017/0164887 A1* | 6/2017 | Chattopadhyay | .... | A42B 3/0433 |
| 2018/0042486 A1* | 2/2018 | Yoshizawa | ........... | A61B 5/0077 |
| 2018/0214072 A1* | 8/2018 | Zingaretti | ............ | A61B 5/7435 |
| 2019/0142725 A1* | 5/2019 | Lee | ........................ | A61K 8/64 |
| | | | | 424/70.7 |
| 2019/0183764 A1* | 6/2019 | Krohn | ...................... | A61Q 5/02 |
| 2019/0240126 A1* | 8/2019 | Celestini | .................. | A61K 8/36 |

OTHER PUBLICATIONS

Yarmolenko, et al. ; Thresholds for thermal damage to normal tissues: An update; Int J Hyperthermia 27(4) ; pp. 320-343 ; 2011 ; 4 4 Pages.
Lanzafame, et al. ; The Growth of Human Scalp Hair in Females Using Visible Red Light Laser and LED Sources ; Lasers in Surgery and Medicine ; pp. 601-607 ; 2014 ; 7 Pages.
Egawa, et al. ; Near-infrared imaging of water in human haur; Skin Res Technology ; Feb. 19, 2013 ; 2 Pages.
ResearchAndMarkets ; Hair Restoration Services Market Report, 2019: $12+ Billion Industry Opportunity Insights to 2026 ; Sep. 25, 2019 ; 4 Pages.
IBISWorld ; Hair Loss Treatment Manufacturing Industry in the US—Market Research Report ; Jun. 2019 ; 7 Pages.
Reportlinker ; Global Alopecia (Hair Loss) Treatment Market Forecast 2019-2027; Feb. 27, 2019 ; 3 Pages.

* cited by examiner

METHODS AND SYSTEMS FOR IMPROVING HUMAN HAIR AND SCALP USING VEHICLE CAMERAS AND BIG DATA AI ANALYTICS

BACKGROUND

Technical Field

The present disclosure is directed to improving the hair and scalp of a vehicle occupant by leveraging vehicle sensor data with big data stored in a data lake and using hair and scalp data artificial intelligence (AI) analytics to provide treatment recommendations.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Hair loss affects both men and women, with some forms of hair loss, such as involutional alopecia, becoming more prevalent with age. Involutional alopecia is a natural condition in which the hair gradually thins with age. Some hair follicles go into a resting phase, and the remaining hairs become shorter and fewer in number. According to the American Hair Loss Association, about 85.0% of men will experience thinning hair by the age of 50 and women comprise an estimated 40.0% of individuals experiencing hair loss in the United States.

Additionally, hair loss can be attributed to a number of factors, including genetics, illness, such as diabetes, actinic keratosis, and thyroid disease and medication side effects, such as hair loss due to chemotherapy. (See: "Hair Loss Treatment Manufacturing Industry in the US—Market Research Report", June 2019, IBISWorld, https://www.ibisworld.com/united-states/market-research-reports/hair-loss-treatment-manufacturing-industry/, incorporated herein by reference in its entirety).

Hair loss is a critical issue among men and women across the world. Men, owing to androgenetic alopecia or common male pattern baldness (MPB), have long been afflicted by hair loss. Women also suffer from androgenetic alopecia. Hair loss in women and men may affect self-image and emotional well being.

According to the National Alopecia Areata Foundation (NAAF), in 2017, 6.8 million people in the U.S. were affected by alopecia. Alopecia is a common autoimmune skin disease that causes hair loss on the scalp, face, and sometimes on the other areas of the body. Similarly, in Europe, baldness is common and countries such as the Czech Republic, UK, Spain, and Germany have high numbers of bald people. Consequently, the number of clinical institutions and hospitals for hair loss treatment in Europe and North America has risen. Further, as reported by the International Society of Hair Restoration, nearly 33,194 surgeries were carried out annually in 2015 in Europe.

Among postmenopausal women, as many as two-thirds suffer hair thinning or bald spots. Hair loss in women often has a greater psychological impact than does hair loss in men, as it is less socially acceptable for women. Alopecia may severely affect the emotional well-being and quality of life for women.

Androgenetic alopecia, or pattern hair loss, loss affects men and women differently. Men may begin gradually losing their hair as early as their teens, typically from the hairline and the crown of the head. In men, hair loss usually begins above the temples, and the receding hairline eventually forms a characteristic "M" shape; hair at the top of the head also thins, often progressing to baldness. Women may have noticeable hair loss at age 40 or later. In women, androgenetic alopecia begins with gradual thinning at the part line, followed by increasing diffuse hair loss radiating from the top of the head. A woman's hairline rarely recedes, and women rarely become completely bald.

There are many potential causes of hair loss in women, including medical conditions, medications, and physical or emotional stress. If an unusual hair loss of any kind is noted, a medical practioner, such as a primary care provider or a dermatologist, should be consulted to determine the cause and appropriate treatment. Two major types of popular hair restoration treatments are follicular unit extraction (FUE) and follicular unit transplantation (FUT). A therapist or support group may also be recommended to address emotional difficulties. (See: "Treating female pattern hair loss", Nov. 14, 2018, Harvard Women's Health Watch, Harvard Health Publishing, Harvard Medical School, https://www.health.harvard.edu/staying-healthy/treating-female-pattern-hair-loss, incorporated herein by reference in its entirety).

Increase in celebrity influence, persistent self-consciousness about facial appearance and societal influence to grow thicker hair are some the key factors that boost the demand for hair care solutions, such as hair restoration services, hair treatments and hair loss products. (See: "Hair Restoration Services Market Report, 2019: $12+ Billion Industry Opportunity Insights to 2026", Sep. 25, 2019, ResearchAndMarkets, Globe Newswire, https://www.globenewswire.com/news-release/2019/09/25/1920454/0/en/Hair-Restoration-Services-Market-Report-2019-12-Billion-Industry-Opportunity-Insights-to-2026.html, incorporated herein by reference in its entirety).

Further, monitoring the health of a human hair or scalp may offer a diagnosis of a wide variety of health conditions. For example, human hair responds to stress (e.g., physical stress and psychological stress). A whole host of internal conditions affect the health of human hair, and as such hair related parameters such as color, thickness, texture, etc., may indicate health disorders such as such stress, fatigue, hair and scalp gain, diabetes, thyroid disease, slow heart rate, aging and lack of essential nutrients, such as iron or biotin, bone growth, etc.

Alopecia is an autoimmune disease, which can lead to an attack on growing cells and hair follicles in the scalp, eyebrows, eyelashes, and elsewhere on the body. Alopecia may be the outcome of various malignancies. Hormonal imbalances and aging may increase the chances of developing chronic diseases like cancer, polycystic ovary syndrome, rheumatoid arthritis, depression, and hypertension, which may also lead to hair loss, especially among middle to senior aged people.

The global alopecia treatment market is expected to proliferate at 5.51% CAGR (Compound Annual Growth Rate) during the years of 2019-2027. This global market for alopecia treatment is geographically bifurcated into several regions, i.e., North America, Europe, Asia Pacific, and the remaining countries constituting the Rest of World segment. The alopecia treatment market in North America is expected to hold the largest share by 2027 and is expected to grow at a CAGR of 4.8% during the forecasting years. The European alopecia treatment market is expected to grow at a CAGR of 4.52%, and the Asia Pacific alopecia treatment market is expected to grow at a CAGR of 7.38% during the forecasting years. Investment in research and development coupled with the growth of high-level healthcare facilities have contributed to the largest shareholding capacity of this region over the market. Organizations such as the National Alopecia Areata Foundation and the American hair Loss Association are helping to spread awareness about alopecia and the available treatments are resulting in growth in healthcare expenditure in this market. Concert Pharmaceuticals Inc., Histogen Inc., Dr Reddy's Laboratories Ltd., Merck & Co., Inc., Ales Groupe, Alpecin, Sun Pharmaceutical Industries Ltd., Vitabiotics Ltd., Aclaris Therapeutics Inc., Johnson and Johnson, GlaxoSmithKline, Daiichi Sankyo, Inc., Lifes2good, Cipla and HCell Inc. are some of the companies operating in the global market. (See: Global Alopecia (Hair Loss) Treatment Market Forecast 2019-2027, Feb. 27, 2019, CISION PR Newswire, https://www-.marketwatch.com/press-release/global-alopecia-hair-loss-treatment-market-forecast-2019-2027-2019-02-27, incorporated herein by reference in its entirety).

Generally, awareness that one has a problem with hair loss occurs very late in the hair loss process, after a significant percentage of thinning and loss has occurred. This is due in part to the lack of readily available mechanisms to objectively determine hair loss. Not only is hair regrowth treatment more effective at an early stage, but increasing awareness of progressive hair loss increases the market opportunity for hair regrowth and scalp treatment therapies.

Early to mid stage hair loss is almost entirely manifested as thinning of the hair shafts of a large percentage of follicles and retarded shaft growth so that the hairs that are present are thin, light and close to the scalp, while follicle density and shafts per follicle are basically unchanged. Only at end-stage baldness do the follicles become irreversibly inactive.

A hair scanning device may use cameras to collect images from a consumer's hair and or scalp and perform hair and/or scalp image processing and analysis. There are many ways to determine hair loss. In a non-limiting example, hair thickness or density (D) may be quantified as the product of three factors: (1) follicular density (F), measured in follicles per square centimeter, (2) average number of hair shafts per follicle (N), and (3) average thickness (T) of the hair shafts, such that D=F×N×T. Another objective measure of hair thinning may be the fraction of hair widths outside of two standard deviations for a selected subset of hair from the head. Another alternative measure of hair density is hair thickness (diameter), which may be replaced with hair cross sectional area, $$A = \pi \frac{T2}{4}.$$

The overall sense or indicator of "fullness" of a head of hair may also include the hair length L, resulting in a hair volume parameter V=F×N×A×L.

Typical follicular unit densities are in the range of 60-120 cm$^2$ and each follicle generally contains one or two shafts, but rarely, more than two hair shafts of varying ages. Hair shaft thickness may be classified as coarse, medium or fine and the mean value of the shaft thickness will vary from about 40 microns in width for fine hair, to an average of 90 microns in width for coarse hair. N will generally be a number between 1 and 2, and more commonly 1 to 1.25, thus it can be eliminated from the density determination. (See: US 2009/0037280, incorporated herein by reference in its entirety).

Hair regrowth products may include hair regrowth preparations such as minoxidil, devices for applying hair regrowth preparations, and other devices such as light therapy devices. As of 2014, minoxidil was the only topical product FDA-approved for androgenic hair loss.

A study of laser treatment showed that low level laser treatment for 16 weeks increased mean hair counts by about 37% relative to placebo treatment. (See: Lanzafame, R., Blanche, R., Chiacchierini, R., Kazmirek, E., Sklar, J., "The Growth of Human Scalp Hair in Females Using Visible Red Light Laser and LED Sources", Lasers in Surgery and Medicine 46:601-607 (2014), incorporated herein by reference in its entirety).

Accordingly, it is one object of the present disclosure to provide methods and systems for improving the hair and scalp of a vehicle occupant. Vehicle cameras record features of the hair and scalp of the vehicle occupant each time he/she occupies a seat in the vehicle. Hair and scalp images may be compared to determine changes over time. These changes may be transmitted to a computer application in a cloud server with access to a data lake and hair and scalp data artificial intelligence (AI) analytics. Based on the analysis, recommendations for improving the hair and scalp may be transmitted to the vehicle occupant.

SUMMARY

In the exemplary embodiments, a method, a system and a non-transitory computer readable medium having instructions stored therein that, when executed by one or more processor, cause the one or more processors to perform a method a method for improving the hair and scalp of a vehicle occupant using vehicle cameras, comprising imaging, with at least one vehicle camera, the hair and scalp of a vehicle occupant each time the vehicle seat occupant sits in a seat of the vehicle, storing the images with timestamps of the images, comparing each current image with at least one stored image having an earlier timestamp, detecting between the current image and the at least one stored image having an earlier timestamp, determining hair and scalp parameters related to the changes, accessing hair and scalp data related to the parameters, analyzing the hair and scalp data, accessing hair and scalp treatment options based on the analysis, accessing hair care and scalp care product information based on the analysis, determining a hair and scalp treatment recommendation including the changes in the hair and scalp images, the hair and scalp parameters, the treatment options and the hair and scalp product information; updating a memory of the vehicle, notifying the vehicle seat occupant of the hair and scalp treatment recommendation and transmitting the hair and scalp images and hair and scalp parameters to a data lake.

In an embodiment, the hair and scalp analysis is performed by a computing system of the vehicle.

In another embodiment, the hair and scalp analysis is performed by the CPU of the vehicle to determine hair and scalp changes between current and previous sets of hair and scalp images and changes in hair and scalp parameters, and then a hair and scalp improvement application is accessed which uses a hair and scalp data artificial intelligence analytics module to to search a data lake and retrieve information for the hair and scalp treatment recommendation.

In a further embodiment, a vehicle user registers with the hair and scalp improvement application. When riding in any one of a plurality of connected vehicles having the hair and scalp analysis software and connected to the hair and scalp improvement application, the vehicle performs imaging of the hair and scalp and transmits the images to the hair and scalp improvement application for further processing.

In an additional embodiment, the hair and scalp images, changes in hair and scalp parameters, and hair and scalp treatment recommendations of a plurality of vehicle occupants are stored in the data lake.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
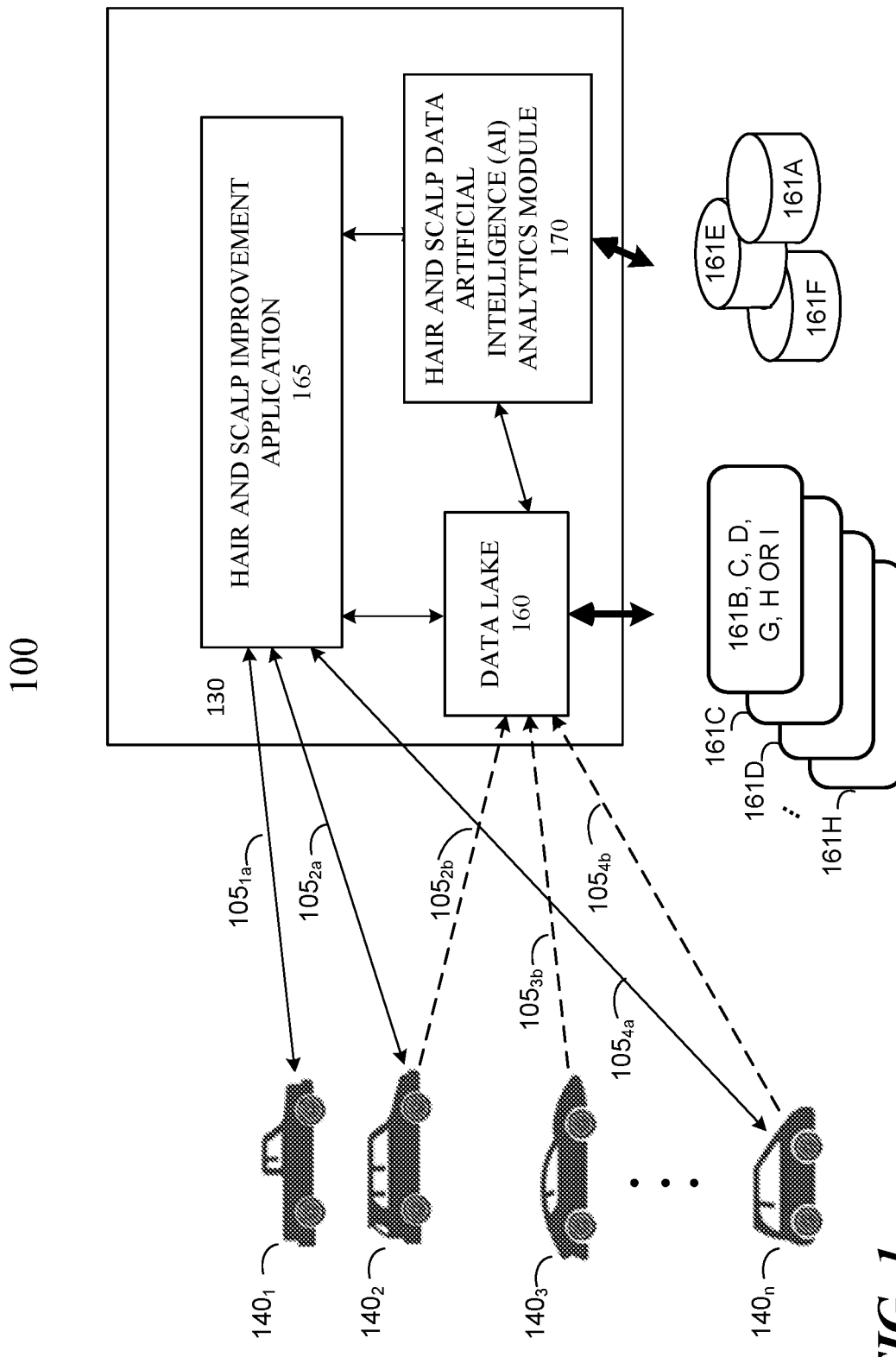
FIG. 1 is an overview of the hair and scalp improvement system, according to certain embodiments.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

In an aspect of the present disclosure, program code may estimate human health and/or changes to human health by monitoring parameters related to changes in the hair or scalp. Hair and scalp related parameters include hair color, texture, brittleness, porosity, thickness, moisture content, oil, number of follicles, scalp crusting, dandruff density, raised or occluded scalp portions, may be used to estimate changes to human health conditions such as stress level, fatigue, lack of essential nutrients (e.g., eating disorders), medical disorders, such as diabetes and thryroid disease, and seborrheic dermatitis, ringworm, eczema, psoriasis, or the like.

In addition to cameras, the vehicle may employ one or more sensors for monitoring hair parameters. These sensors may include moisture (humidity) sensors, chemical sensors, temperature sensors, thickness sensors, or the like.

In a non-limiting example, vehicle cameras may be used to sense changes in the thickness of the scalp. A thick crust on the scalp may indicate psoriasis, which can be distinguished from other dandruff-like scalp conditions by the presence of a thickening scab-like surface. Psoriasis is the most common of all the autoimmune diseases and occurs when the skin goes into overdrive, sending out faulty signals that speed up the turnover and growth of skin cells.

A hair parameter which is monitored using the vehicle cameras is hair density, which may indicate hair loss. A human normally sheds approximately 100 to 150 hairs a day. However, a larger amount of hair loss may be a matter of concern regarding the health of the vehicle occupant. One common cause of hair loss may be a sudden psychological or physical stressor. Physical stressors that may lead to temporary hair loss include iron deficiency anemia and protein deficiency; these are particularly common in those who suffer from eating disorders. Diabetes may also cause hair to thin or to start to fall out suddenly. Sudden hair thinning or hair loss may be considered an early warning sign that diabetes is affecting hormone levels. A number of medications may also cause hair loss as a side effect. Hormonal changes may also cause hair loss. Thyroid disease, especially hypothyroidism, may be one of the most common causes of hair loss. Early detection of hair loss may be instrumental in diagnosing and treating these diseases.

Dry brittle hair that breaks off easily may also be a monitored parameter of the hair that may indicate the health of the vehicle occupant. Breakage may be most frequently the result of hair becoming over-brittle from chemical processing or dyeing. However, certain health conditions may also lead to brittle, fragile hair. Among these health conditions include Cushing's syndrome, hypoparathyroidism, low levels of parathyroid hormone and lack of omega-3 fatty acids. Brittle hair can be detected by measuring the length and cross sectional diameter of a hair strand and by detecting jagged or split ends.

Cushing's syndrome is a disorder of the adrenal glands that causes excess production of the hormone cortisol. Hypoparathyroidism is usually either hereditary or the result of injury to the parathyroid glands during head and neck surgery, and may also cause dry, brittle hair. Overly low levels of parathyroid hormone cause blood levels of calcium to fall and phosphorus to rise, leading to fragile dry hair, scaly skin, and more serious symptoms such as muscle cramps and even seizures. In some aspects, the camera images are analyzed to measure the moisture content of the hair, which in turn can be used to estimate one or more of the health conditions discussed above.

Another monitored hair parameter may be dandruff. Dandruff is a complicated interaction of health issues that deserve to be taken seriously. Seborrheic dermatitis is a chronic inflammatory condition of the scalp that causes skin to develop scaly patches, often in the areas where the scalp is oiliest. When the flaky skin loosens, it leaves telltale "dandruff" flakes, which may be detected in the camera images.

A further monitored hair parameter is hair color, which may provide a window to a person's health. Stress may trigger a chain reaction that interferes with how well the hair follicle transmits melanin, the pigment that colors hair. Free radicals are hormones that may be produced when the vehicle occupant is under stress, and may block the signal that tells the hair follicle to absorb the melanin pigment, causing premature gray hair. The computer application may recommend stress treatments, medical professionals, dermatologists, hair restoration centers, soothing music tracks, aromatherapy or the like to the vehicle occupant to relieve the stress. Nutritional deficiency may also be detected by comparison of the hair and scalp images over time. Hair reflects the mineral content of the body's tissues. If a mineral is either deficient or present in excess, it indicates a mineral deficiency or excess within the body, especially in conditions of malnourishment leading to protein deficiency which may be characterized by dry and light-colored hair. Similarly, zinc deficiency may cause diffuse hair loss, lighter colored hair, and eczema. Similar changes are seen in cases of fatty acid deficiency. Viral and bacterial infections and general weakness of the body may also result in hair loss, brittleness and dryness.

In an aspect of the present disclosure, at least one of the cameras may be an extended indium gallium arsenide near infrared (NIR) camera, which is able to detect changes in brightness of the hair follicle. NIR cameras have high sensitivity in low light and provide high contrast images. (See: Egawa, M., Yanai, M., "Near-infrared imaging of water in human hair", May 2013, Vol. 19(2), page 205, PubMed, NCBI Resources, https://www.ncbi.nlm.nih.gov/pubmed/22672448; "Near-Infrared (NIR) Cameras with High Sensitivity in Low Light", Basler, Inc, Exton, 855 Springdale Drive, Suite 203, Exton, Pa., USA, both incorporated herein by reference in their entirety). The NIR camera images may be analyzed to determine the moisture content of the hair. Low moisture content may indicate dry, thin, fragile hair and may further indicate an underlying scalp disease or medical problem.

A temperature sensor near the position of the top of the head of the vehicle occupant may be used to provide the temperature of the scalp, which may be used in the hair and scalp analysis.

In an aspect of the present disclosure, a light source may be located so as to illuminate the head to improve the camera images and detection of changes in density of the hair.

Aspects of the present disclosure are directed towards the use of vehicle internal cameras to monitor a vehicle occupant's hair and scalp over a period of time. The period of time may be days, months and years. The camera images are transmitted to a hair and scalp improvement application in a data center configured with a hair and scalp data artificial intelligence (AI) analytics module and a data lake. The data lake may hold hair images related to hair types (thick, thin, bristly, brittle, etc), hair colors, age of vehicle occupants and genders. Further, the hair and scalp images of the vehicle occupant are compared over time to hair and scalp images of the vehicle occupant previously stored previously stored in vehicle memory (252, FIG. 2A) or in a database (364, FIG. 3A) of the hair and scalp improvement application to determine changes in hair color, texture, brittleness, porosity, thickness, moisture content, oil, number of follicles, scalp crusting, dandruff density, raised or occluded scalp portions or other hair loss indicators and is compared to previously stored accessed by the data center. The data lake may store millions of hair and scalp images, hair types, medical data related to hair and scalp related conditions or baselines for all hair and scalp types and link to other relevant databases. A determination may be made as to whether the hair is thinning, greying or changing texture and a recommendation for treatment of the hair and/or the scalp is transmitted to the vehicle computer to be displayed or communicated to the vehicle occupant.

Big data includes information gathered from social media, data from internet-enabled devices (including smart phones and tablets), machine data, video and voice recordings, and the continued preservation and logging of structured and unstructured data. Big data refers to the dynamic, large and disparate volumes of data created by people, tools and machines which are distributed over a set of storages. The data gathered may be stored beforehand or may be a continuous stream to be accessed, stored and analyzed with distributed algorithms and frameworks.

Big data AI analytics is the often complex process of examining large and varied data sets, or big data, to uncover information, such as hidden patterns, unknown correlations, market trends and customer preferences that can help users make informed decisions. Big data analytics requires a set of distributed computing, networking and storage resources that may be available locally or are rented from a cloud infrastructure. In this manner, big data is related to cloud computing. In an aspect of the present disclosure, a big data AI analytics program or set of programs is trained to search, analyze and process hair and scalp data sourced from a (big data) data lake and other databases.

The Toyota Data lake collects and analyzes data from vehicles equipped with a Data Communication Module (DCM), using a next-generation connected-vehicle framework, which transmits data over cellular networks. The Toyota Data lake (TBDC) in the Toyota Smart Center analyzes and processes data collected by the DCM, and uses the data to deploy services under high-level information security and privacy controls. (See "Toyota Accelerates Its Connected Car Technology Initiatives", 2016, https://pressroom.toyota.com/releases/toyota+connected+car+technology+accelerates.htm, and "Toyota's Connected Strategy Briefing", 2016; "Toyota to make "Connected Vehicles" its new standard in Japan, Jun. 26, 2018, https://global.toyota/en/newsroom/corporate/23157821.html, each incorporated herein by reference in its entirety).

A data lake is a storage mechanism designed to facilitate the colocation and use of many different types of data, including data that is date-defined using various schemata, structural frameworks, blobs and other files. A data lake is a system or repository of data stored in its natural/raw format, usually object blobs or files. A data lake is usually a single store of all enterprise data including raw copies of source system data and transformed data used for tasks such as reporting, visualization, advanced analytics and machine learning. A data lake can include structured data from relational databases (rows and columns), semi-structured data (CSV, logs, XML, JSON), unstructured data (emails, documents, PDFs) and binary data (images, audio, video). A data lake is a centralized repository which stores structured and unstructured data at any scale. The data may be stored as-is, without having to first structure the data. Different types of analytics, from dashboards and visualizations to big data processing, real-time analytics, and machine learning operate on the data from the data lake to guide better decisions.

A data warehouse is a database optimized to analyze relational data coming from transactional systems and line of business applications. The data structure, and schema are defined in advance to optimize for fast SQL queries, where the results are typically used for operational reporting and analysis. Data is cleaned, enriched, and transformed so it can act as the "single source of truth" that users can trust.

A data lake is different from a structured data warehouse, because it stores relational data from line of business applications, and non-relational data from mobile apps, IoT devices, and social media. The structure of the data or schema is not defined when data is captured. This means the data can be stored without careful design or the need to know its future purpose. Different types of analytics use this data, for example, SQL queries, big data analytics, full text search, real-time analytics, and machine learning can be used to uncover insights. The data lake of the present disclosure may contain unstructured data sourced from a plurality of connected vehicles, and may not necessarily contain only hair and scalp data. For example, the data lake may contain information related to vehicle operating parameters, images of the surrounding environment which may be used in mapping or GPS route determination, speed of the vehicle or surrounding vehicles, etc.

In accordance with one or more embodiments, program code may be implemented to track changes in the hair or scalp of a vehicle occupant. The program code may be developed, instrumented or embedded for execution on a general or specialized computing machine. For example, in one aspect, the program code may be designed as software (hereafter referred to as a computer application or "app" by way of example) to run on a vehicle computing system, which "app" also may be installed on a handheld user device, such as a tablet or a smart phone. The computer application may be stored in the data center or may be stored in an application cloud or server.

Aspects of the present disclosure are directed to a method for improving the hair and scalp of a vehicle user by using vehicle cameras and hair and scalp data artificial intelligence (AI) analytics, a system for improving the hair and scalp of a vehicle user by using vehicle cameras and hair and scalp data artificial intelligence (AI) analytics and a non-transitory computer readable medium having instructions stored therein that, when executed by one or more processors, causes the one or more processors to perform a method for improving the hair and scalp of a vehicle user by using vehicle cameras and hair and scalp data artificial intelligence (AI) analytics.

An overview of the system for improving the hair and scalp of a vehicle user is shown in FIG. 1. Vehicles $140_1$, $140_2$, $140_3$, . . . , $140_n$ each include an onboard communication system which is configured to communicate with data center 130. A hair and scalp improvement application 165 is stored in a data center 130 and may access the data lake 160 for information regarding hair or scalp parameters and includes a hair and scalp data artificial intelligence (AI) analytics module 170 which is trained to provide a high level analysis of the information. The hair and scalp data artificial intelligence (AI) analytics module 170 may be used to generate the search queries which are transmitted to the data lake. In non-limiting examples, the hair and scalp data artificial intelligence (AI) analytics module 170 may search the data lake with search tools, such as Elastic Search, Azure Data Explorer and Talend. The data lake may use the search queries to search within its unstructured and structured data and also to search a multitude of hair and scalp related warehouses, such as medical databases, dermatologists, hair and scalp journals, hair restoration centers, cosmetologists, research articles, blogs, hair loss or hair treatment product information, and the like. The data lake 160 may store the search results with hair and scalp images of seat occupants of each of the vehicles 140, along with hair and scalp treatment recommendations and anonymized user profile information, such as age, height, ethnic group, income group, and the like, for use in future hair and scalp analyses.

In a non-limiting example, the data lake may store the names of dermatologists, medical professionals or hair loss professionals in the home area of an identified driver or passenger. In a further non-limiting example, the data lake may store the names of dermatologists, hair loss professionals or medical professionals in the current location of the connected vehicle 140 based on GPS data received from the vehicle. In another non-limiting example, the data lake may store lists of hair or scalp repair products recommended for hair loss and provide the names of retail outlets which carry the products and which are in the current or home location of the driver or passenger.

The internal cameras of a vehicle 140 can be configured to record hair and scalp images of a vehicle occupant at regular intervals (such as several times per day, over weeks, months and years or every time the person enters the vehicle). Comparisons of these images may be able to be used to detect hair and scalp parameter changes, since the hair and scalp images may represent a long and extensive history of the hair and scalp parameters of the driver and passengers. The time period of comparison is preferably in the range of one hour to five years, more preferably in the range of one hour to one year, most preferably in the range of one hour to two months.

In some aspects of the present disclosure, images and/or changes in hair and scalp parameters are collected into a data packet by an integrated processor or microcontroller (such as CPU 250) and transmitted wirelessly, by an onboard communication module (210, FIG. 2A), to the hair and scalp improvement application (165, FIG. 1, 365, FIG. 3A), where the data of the packet is analyzed to estimate the health of the hair and scalp and provide treatment recommendations to the vehicle occupant. The analysis may include accessing the hair and scalp data artificial intelligence (AI) analytics module 170 (also referred to as 370 in FIG. 3A) and searching a data lake 160 (also referred to as 360 in FIG. 3A) storing hair and scalp information. As shown in FIG. 3B, the data lake may be connected to a plurality of hair and scalp related warehouses, such as medical databases, dermatologists, hair and scalp journals, hair restoration centers, cosmetologists, research articles, blogs, hair loss or hair treatment product information, and the like, and may be able to source hair loss and scalp information to aid the hair and scalp data artificial intelligence (AI) analytics module 370 in preparing a recommendation to the vehicle occupant for managing, treating or improving the condition of his/her hair or scalp.

In a further aspect, a vehicle user may register directly with the hair and scalp improvement application through a smart device, such as a smart phone, a tablet or a laptop. When riding in any one of a plurality of connected vehicles including the hair and scalp analysis software and connected to the hair and scalp improvement application, the vehicle performs imaging of the hair and scalp and transmits the images to the hair and scalp improvement application for further processing. In this aspect, the vehicle may download previous facial and hair and scalp images from a database 364 of the hair and scalp improvement application 365, compare the current images to the previous images to detect changes in the hair and scalp of the vehicle user, detect parameter changes and transmit a data packet including the changes in hair and scalp parameters and the current images to the hair and scalp improvement application. Alternatively, the vehicle may receive a request from the hair and scalp improvement application to record the hair and scalp images and transmit the images to the hair and scalp improvement application for further processing.

The data lake may include big data collected by vehicle sensors and comprise millions and possibly billions of hair and scalp records of humans of all ages, heights, weights, genders, ethnic groups, etc. Medical and other data related to hair improvement and information on recommended treatment may be stored in the data lake. Based on this data, the hair and scalp improvement application can correlate the hair and scalp images with the medical data and data from related data warehouses to determine a treatment recommendation. Further, the hair and scalp improvement application (165/365, FIG. 1, 3A) can include a database 364 which includes lists of physicians, dermatologists, hair restoration centers, hair treatment products, scalp treatment products, retail outlets carrying hair and/or scalp treatment products, hair treatment regimes, and the like, and may recommend a physician, dermatologist, hair restoration center or retail outlets carrying hair or scalp treatment products near the home or current location of the driver or passenger. The hair and scalp improvement application can also store information related to hair loss or hair loss products and recommend a product which aids in hair or scalp improvement.

In an aspect of the present disclosure, the hair and scalp improvement application may be a subscription based application and/or may be included with the vehicle. In either case, the identities of the driver and passengers are protected by strict high-level information security and privacy control.

Figure 2A:
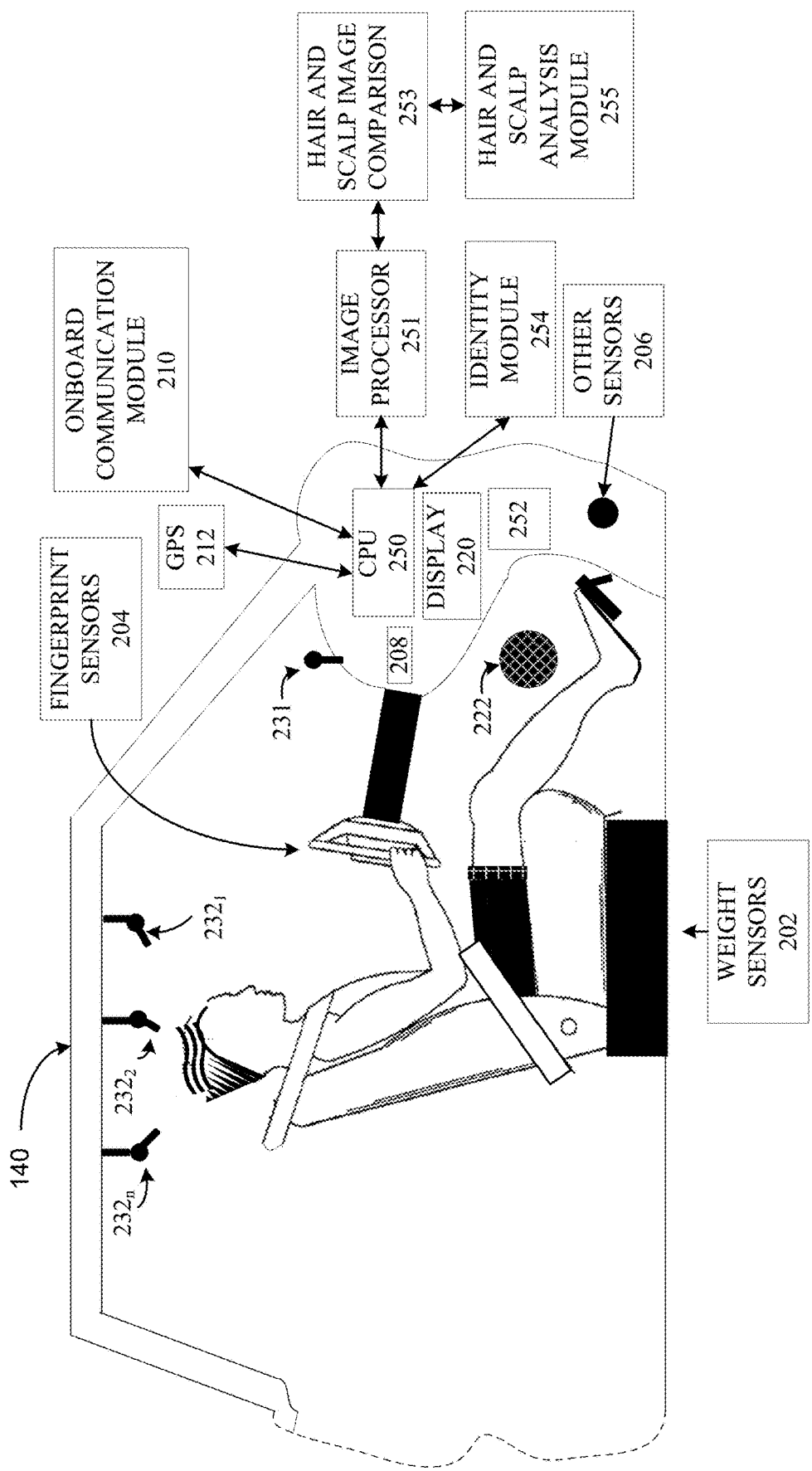
FIG. 2A illustrates a vehicle having an onboard communication module and hair and scalp improvement processing capability, according to certain embodiments.
Figure 2B:
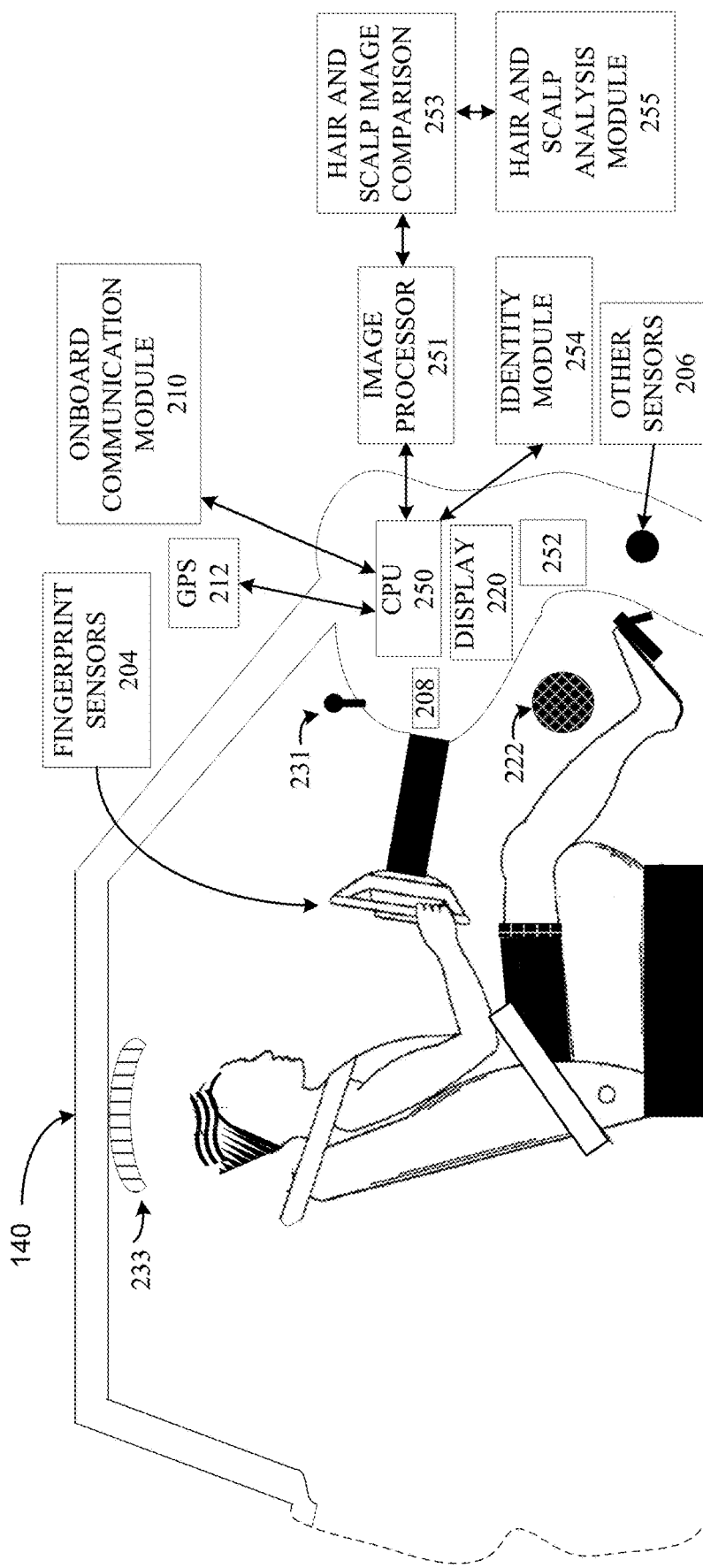
FIG. 2B illustrates a camera module arranged to image a vehicle seat occupant, according to certain embodiments.

As shown in FIG. 2A, 2B, vehicle 140 includes a control system including a CPU 250, an onboard communication module 210, a GPS unit 212, a display 220, an image processor 251, a memory 252, one or more cameras 232, one or more 360 degree cameras 231, weight sensors 202 in each seat, fingerprint sensors 204 (optional), GPS unit 212, a hair and scalp image comparison module 253, a hair and scalp analysis module 255, speakers 222, a display 220 and a user interface 208. Individual cameras 232 or a camera module 233 (shown in FIG. 2B) above the head of a vehicle occupant are configured to determine hair and scalp images of the seat occupant.

Camera 231 may be directed to the face of the driver or toward the face of a passenger to record facial images for identity purposes. Cameras 232 are directed towards the hair and scalp of the vehicle occupant. The front most camera 232 (shown as camera 232, in FIG. 2A) may be adjustable so as to image the face of the vehicle occupant rather than or in addition to images taken by camera 231. The vehicle may have a plurality of cameras ($232_1, \ldots, 232_n$, FIG. 2A) directed to driver or passenger locations. These facial images and the hair and scalp images are sent to the CPU 250, which includes circuitry including at least one processor including program instructions configured for analysis of the images. Image processor 230 is configured for processing for timestamping the images, which are stored in memory 252. The CPU 250 may identify the driver or passenger by the facial images gathered by camera 231 via identity module 254 and may store the facial images in a database including a profile image of the driver or passenger. The profile image may be updated by the current image. Additionally, the CPU 250 may be configured to use the facial images with data obtained from the other vehicle sensor(s), such as fingerprint sensors 204 on the steering wheel, other sensors 206, such as audio sensors, retinal sensors or the like, or inputs at a user interface 208 to determine the identity of the seat occupant of the vehicle.

In a first alternative, the vehicle may not have a 360 degree camera 231 for identifying the vehicle seat occupant by facial recognition. Reception of a weight measurement signal by the CPU as the seat occupant sits may trigger a measurement by fingerprint sensors 204 or other sensors 206, such as audio sensors or retinal sensors. These sensor signals are then matched to stored profile sensor signatures to identify the seat occupant.

In a second alternative, reception of a weight measurement signal by the CPU as the seat occupant sits may trigger camera 231 to take an image of the seat occupant.

In a further alternative, upon reception of a weight measurement signal, the CPU may query the seat occupant for his/her name through speaker 222 and match the seat occupant's voice to a stored recording of his/her voice.

In another further alternative, upon reception of a weight measurement signal, the CPU may query the seat occupant to enter his/her name or password on display 220 and accept the name or password through the user interface 208.

Whether subscription based or a standalone vehicle program, the driver of the vehicle may be identified (in identity module 254) by the N in-vehicle cameras ($232_1$, $232_2, \ldots, 232_n$), by facial recognition using a 360 degree dashboard camera (231) or by vehicle sensors, such as voice recognition, retinal readers (other sensors 206) or fingerprint readers 204. Fingerprint readers 204 may be located on the steering wheel or may be in another location near the interior dashboard or on a user interface 208. Further, a passenger (not shown) may be identified by the cameras or the sensors.

The vehicle cameras are not limited to an individual camera or a series of individual cameras ($232_1, 232_2, \ldots, 232_n$) as shown in FIG. 2A, but may include a plurality of types of cameras, such as near infrared (NIR) cameras. The plurality of cameras may be N cameras 232, where $N \leq 100$.

Figure 2C:
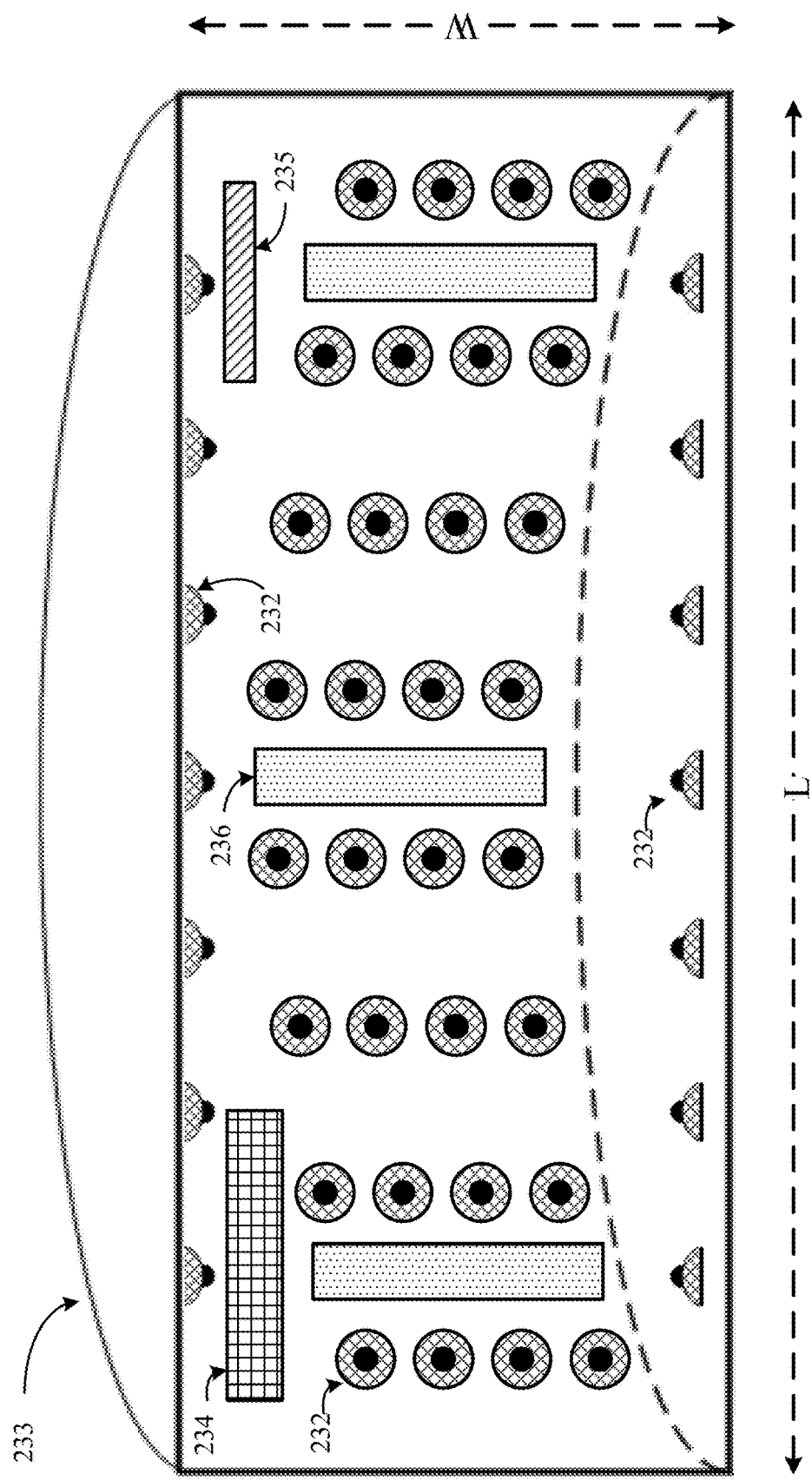
FIG. 2C illustrates the camera module of FIG. 2B including visible light cameras, according to certain embodiments.

The cameras 232 may be contained in a camera module (233, FIG. 2B-2E), which may include light sources 236, a plurality of cameras 232 and a plurality of types of cameras. As shown in FIG. 2C, the camera module 233 may also include a temperature sensor 235 and a moisture sensor 234 to detect the temperature and moisture of the scalp as shown in FIG. 2C. The light module 233 of the present disclosure is not limited to the number of cameras 232, light sources 236, moisture sensors 234, temperature sensors 235 and structural configuration shown in FIG. 2A-2E, but may be any combination and number of elements in a structural configuration which adapts to the curvature of the vehicle framework. FIG. 2C shows the underside (looking up from the top of the driver's head) of the camera module 233 which is curved towards the head of the driver or passenger. Although only a single set of cameras or a single camera module is shown in FIG. 2A and FIG. 2B, there may be a sets of cameras or a camera module located above each passenger in the vehicle. The interior cavity of the camera module 233 may include backlighting or lights (not shown) to illuminate the head of the vehicle occupant. Alternatively, a lighting module may be separate from the camera module. The image processor 251 may be configured to determine the quality of an image and provide feedback to the CPU 250 for turning the cameras 232 on and off and for operating the backlighting, lights interior to the camera module 233 or separate lighting source (not shown). The CPU is also operatively connected to receive measurements from the thermal sensor 235 and use the measurements to control the heat due to the lighting within the camera module 233 and the electronics. Above a threshold of 43° Celsius, thermal damage may occur to the scalp. (See: Yarmolenko et al., "Thresholds for thermal damage to normal tissues: An update", Int J Hyperthermia. 2011; 27(4): 320-343, incorporated herein by reference in its entirety). Hair may be damaged at a temperature above 38° Celsius, so the upper temperature within the camera module should not be higher than 43° Celsius.

Referring to the embodiment of the camera module 233 shown in FIG. 2C, a plurality of cameras 232 are located along the inside ceiling of the camera module. Cameras 232 may also be located along each side of the module so as to image the sides of the vehicle occupant's head. Also shown is a moisture sensor 234 and a temperature sensor 235. Light sources 236 may be placed between each row of cameras or periodically as shown to provide illumination of the head. The light sources may flash or provide constant lighting during imaging. The image processor 251 may be configured to determine the quality of an image and provide feedback to the CPU 250 for turning the cameras 232 on and off and for operating the lighting of the light sources.

Figure 2D:
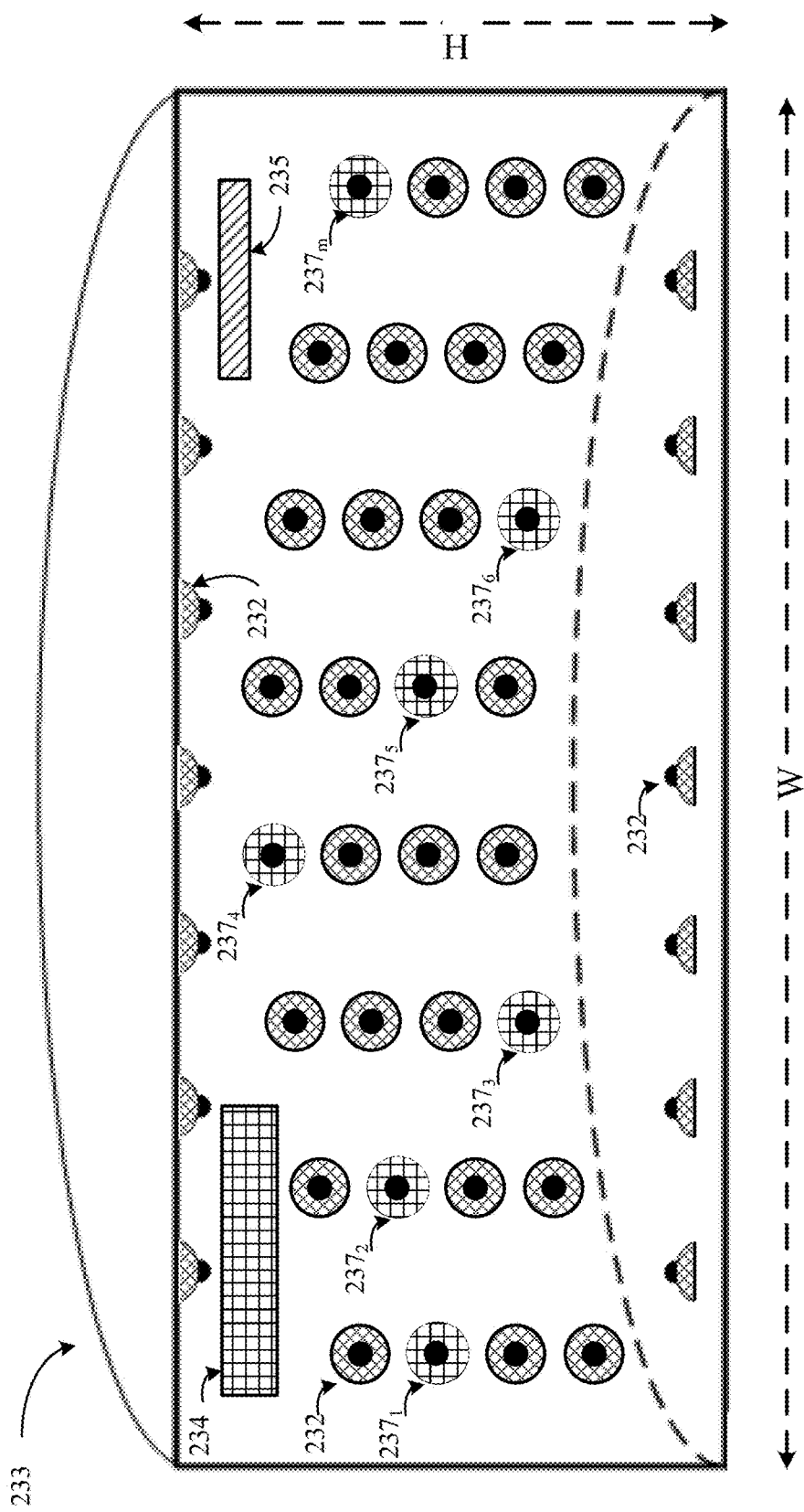
FIG. 2D illustrates the camera module of FIG. 2B including visible light cameras and NIR cameras, according to certain embodiments.

In an alternative embodiment of the camera module 233 shown in FIG. 2D, a number M of the cameras may be NIR cameras ($237_1, 237_2, \ldots, 237_m$), where M≤25. NIR cameras are adapted for imaging in low lighting conditions. The NIR cameras may be alternately operated with the cameras 232. Images from NIR cameras may be processed to determine the density of the hair strands.

Figure 2E:
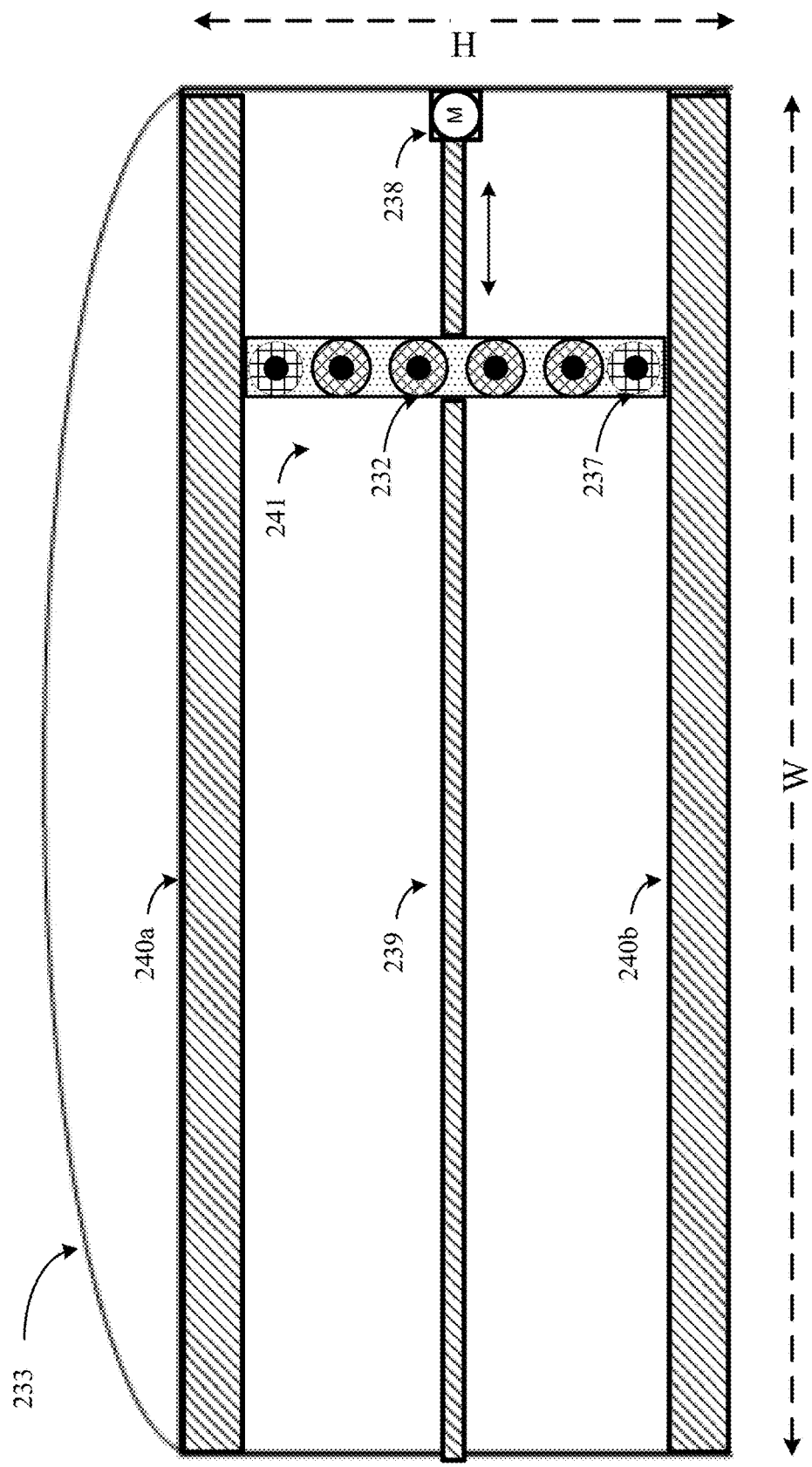
FIG. 2E illustrates a scanning camera module, according to certain embodiments.

In another alternative embodiment of the camera module 233 shown in FIG. 2E, the camera module 233 may include a moving light bar 241 which holds a plurality of cameras 232 and NIR cameras 237. A motor 238 may be configured to move the light bar 241 by means of gearing, a worm gear, or the like to travel from a first end to a second end along a shaft 239. Each end of the light bar may hold a wheel or a bearing (not shown) which is configured to rotatably or slidably move within tracks 240a and 240b. Cameras 232 may be configured to take pictures of the hair and scalp of the vehicle occupant at time intervals. In a non-limiting example, the motor 238 may move the light bar across the light module 233 in a period of time of one minute. The cameras 232 may be configured to take pictures simultaneously, or may take images one at a time or in combinations of two or more at a time. The light bar 241 may also hold NIR cameras 237. The number of cameras and NIR cameras on the illuminating light bar is dependent on the width of the length and width of the camera module. The image processor 251 may be configured to determine the quality of an image and provide feedback to the CPU 250 for driving the position of light bar 236 by actuating the motor 238, for turning the cameras 232 and NIR cameras 237 on and off and for operating the lighting of the light bar. In a non-limiting example, the camera module may have a length of 30 cm (about one foot) and a width of 15 cm (about 6 inches). The light bar may be flashed or illuminated when imaging with cameras 232 and may turn off when imaging with NIR cameras. The thermometer 235 measurements may be used to signal the CPU 250 to turn off the light bar and cease imaging when the temperature rises above a threshold, in order to avoid damaging the scalp or the hair.

Moisture sensor 234 may be included within the camera module 233 or may be a standalone unit (not shown). The moisture sensor 234 may measure the humidity of the environment above the head of a vehicle occupant. The measurement may be compared with ambient humidity to determine the moisture content of the hair of the vehicle occupant and also to determine whether the camera module may damage the hair/scalp of the vehicle occupant due to heating. The CPU 250 may increase the humidity content of the ambient air in order to combat the dryness of the air surrounding the head of the vehicle occupant. A humidity control unit (not shown) may be included in the air conditioning system of the vehicle.

Referring back to FIG. 2A, weight sensors 202 may detect a vehicle user each time he/she occupies a seat. Detection of increased weight triggers the camera module to take current images of the hair and scalp of the vehicle user. A hair and scalp image processor 251 receives the current hair and scalp images for each seat occupant and timestamps the images before storing them in memory 252. These current hair and scalp images are compared by hair and scalp image comparison module 253 to previous hair and scalp images stored in the memory 252, which were collected over a time period, for example, over the last three month period. The comparisons are sent to the hair and scalp analysis module 255. The hair and scalp analysis module 255 may detect a change in the hair and scalp parameters. Upon determining a parameter change, the hair and scalp analysis module 255 may access a database stored in memory 252 which holds records of hair and scalp images, causes of hair and scalp parameter changes and treatments for negative parameter changes. The hair and scalp analysis module 255 may make a hair and scalp treatment recommendation to the vehicle seat occupant.

In a non-limiting example, the vehicle system may send a notification alert, such as: "You have lost hair density in the past 3 months. This may be indicative of a medical condition, such as diabetes or a thyroid imbalance. Dr. XX specializes in these medical conditions. His phone number is VVV-VVV-VVVV. Do you want to call Dr. XX now to make an appointment?" or "Your hair has become drier and more brittle in the last month. Product YY is a moisturizer for this dryness. Product YY is available at Retail Outlet KK. Do you want directions to Retail Outlet KK?".

The hair and scalp analysis module 255 may transmit the hair and scalp analysis, by onboard communication module 210), to the hair and scalp improvement application (165/365, FIG. 1, 3A) for search of data lake 360.

The hair and scalp improvement application may access hair and scalp data artificial intelligence (AI) analytics module 370 (also 170, FIG. 1) to search for information in the data lake to determine information related to the hair and scalp parameter changes. The hair and scalp improvement application may suggest hair and scalp improvement products, a hair and scalp care regime, physicians, vitamin supplements and the like to the vehicle occupant. Additionally, the hair and scalp improvement application may recommend that the driver/passenger should visit a hair improvement professional, such as a dermatologist, a cosmetologist or a hair restoration center, and provide a list of professionals in either the current or the home area of the seat occupant. The vehicle memory 252 may be updated by the recommendations from the hair and scalp improvement application.

The methods of the present disclosure include leveraging hair and scalp data artificial intelligence (AI) analytics technology, to provide baselines for each hair and scalp type.

Aspects of the present disclosure may use big data sources to obtain current and historical and/or predictive information to form a hair and scalp analysis database.

For example, current and historical information may be sourced from a data lake database compiled from the hair and scalp images and parameters of other drivers/passengers of vehicles ($140_1$, $140_2$, $140_3$, $140n$) connected to the hair and scalp improvement application. The data lake data may further include body hair and scalp images which have been previously correlated to hair improvement information, such as sourced from medical databases.

Cloud computing is network-based computing in which typically large collections of servers housed in data centers or "server farms" provide computational resources and data storage as needed to remote end users. Some cloud computing services provide access to software applications such as word processors and other commonly used applications to end users who interface with the applications through web browsers or other client-side software.

An application execution system that executes online web applications can implement a platform for distributing web applications. The web applications can be developed on the application execution system and distributed through an online store. Distributed web applications can be installed on accounts so that user data of users that access the installed web application can be segregated from access by developers of the web application, and source code of the web application can be segregated from access by users or purchasers of the web application.

The software application is deployed in data center 130. The data center 130 includes access to storage systems, databases, and analytics program modules, as needed, that can provide functionality that is required by the application.

Referring again to FIG. 2A, the vehicle 140 may include a plurality of 360 degree cameras 231 wherein a camera is directed at the level of a face of a person seated in each different seat position. The CPU 250 includes circuitry configured to adjust the focus and direction of the camera lens as determined by the image processor 251. The facial image and height of each vehicle occupant may be stored at the time of registration and used to redirect the camera field of view. The height may be adjusted over time by the identify module 254 if the vehicle occupant is a child.

The CPU 250 is implemented, for example, using one or more ECUs. In particular, the CPU 250 is communicatively coupled to the one or more sensors (202, 204, 206, 234, 235), display 220, image processor 251, hair and scalp analysis module 255, image processor 251, hair and scalp comparison module 253, memory 252, and one or more cameras 231 and 232 to receive data therefrom, for example, via a transmission or signal wire, a bus (e.g., a vehicle CAN), radio frequency, etc. Further, the CPU 250 is communicatively coupled to the onboard communication module 210 to transmit and receive communications to or from the hair and scalp improvement application 165 in the data center 130 in the cloud.

The CPU 250 may comprise a single Central Processing Unit (CPU), or could comprise two or more processing units. For example, the processing unit 250 may include general purpose microprocessors, instruction set processors and/or related chips sets and/or special purpose microprocessors such as Application Specific Integrated Circuits (ASICs). The processing unit 250 may also comprise a memory or storage for caching and other purposes. Those of ordinary skill in the art understand that any other node, controller, unit, database and/or device described herein may be similarly implemented.

Principal components of a CPU include an arithmetic logic unit (ALU) that performs arithmetic and logic operations, processor registers that supply operands to the ALU and store the results of ALU operations, and a control unit that orchestrates the fetching (from memory) and execution of instructions by directing the coordinated operations of the ALU, registers and other components.

The memory 252 is a computer readable medium and is connected to the CPU 250. The memory stores computer readable instructions e.g. in the form of computer program modules. For example, the memory 260 may be a flash memory, a Random-Access Memory (RAM), a Read-Only Memory (ROM) or an Electrically Erasable Programmable ROM (EEPROM).

The hair and scalp analysis module 255 may access a database in memory 252 when analyzing the hair and scalp parameter changes. The hair and scalp parameter changes and identity of the seat occupant may be transmitted by onboard communications module 210 to hair and scalp improvement application 165 in data center 130 for further analysis. The hair and scalp improvement application may be implemented in any one of a cloud computing environment, a web application residing on one or more servers, a website, a block chain system and a distributed server system. The hair and scalp improvement application may update the in-vehicle hair and scalp analysis module 255 with the recommendations.

In addition, the identity module may request the input of a voice of the seat occupant, the aroma sensor may identify the seat occupant by smell, a fingerprint may be requested at the user interface 208, or the like, to generate an identification of the vehicle occupant.

The image processor receives the images of each identified driver or passenger and stores the images and memory in a database in memory 252. Memory and/or database may store user profiles of drivers and passengers of the vehicle, and historical hair and scalp images of each driver and passenger.

The hair and scalp images of each driver or passenger are stored over time, such as days, weeks, months and years. These images are compared by hair and scalp image comparison module 253 to determine changes in the images over time. The time period of comparison is preferably in the range of one hour to five years, more preferably in the range of one hour to one year, most preferably in the range of one hour to two months. The vehicle includes a hair and scalp analysis module 255, which determines a change in the appearance of the hair or the scalp, such as a change in hair color, texture, brittleness, porosity, thickness, moisture content, oil, number of follicles, scalp crusting, dandruff density, raised or occluded scalp portions and the like from the changes in the parameters. The hair and scalp analysis module 255 searches a hair and scalp database in memory 255 for information which may indicate causes of the changes in the hair and scalp appearance. If the hair and scalp analysis module 255 does not find enough stored information to make a treatment recommendation, the hair and scalp parameters are transmitted to the computer application 365 for a higher level search and analysis.

The hair and scalp analysis module 255 may provide audio (on speakers 222) or displayed feedback (on display 220) directly to the identified driver or passenger, such as "Your hair looks drier and more brittle this month. It is recommended that you wear a hat, decrease your blow dryer settings and avoid direct sunlight" or "Your hair has become drier and more brittle this month. It is recommended that you use a moisturizing product on your hair". The hair and scalp analysis module 255 may recommend a moisturizing product and a location where the moisturizing product can be purchased.

Alternatively, the hair and scalp analysis module 255 may recommend medical treatment when rapid hair loss is detected. If a user profile contains the names and telephone numbers of medical professionals known to the identified driver or passenger, the hair and scalp analysis module 255 may ask if the driver or passenger would like to call the medical professional, and the onboard communication module may process the call. Alternatively, the hair and scalp analysis module 255 may recommend a medical professional from a stored list of medical professionals in the home location of the identified driver or passenger. In a non-limiting example, the feedback provided may be "Your rapid hair loss indicates that you may have a medical condition, such as low thyroid levels or diabetes. Dr. XXX is a dermatologist in your home area. Do you wish to call Dr. XXX to make an appointment?". The CPU 250 may then dial the call to Dr. XXX.

Figure 3A:
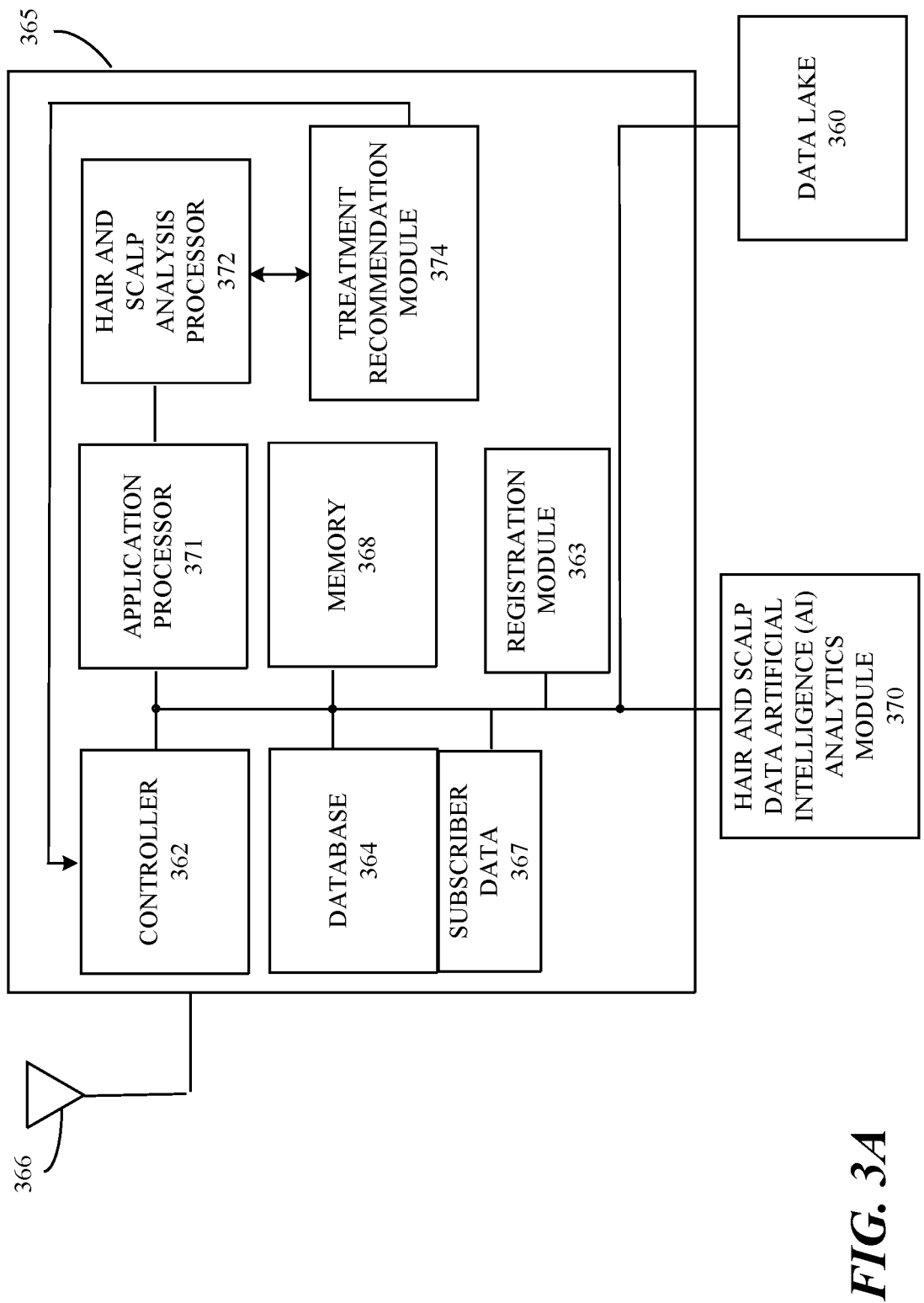
FIG. 3A depicts the computing environment of the hair and scalp improvement application, according to certain embodiments.
Figure 3B:
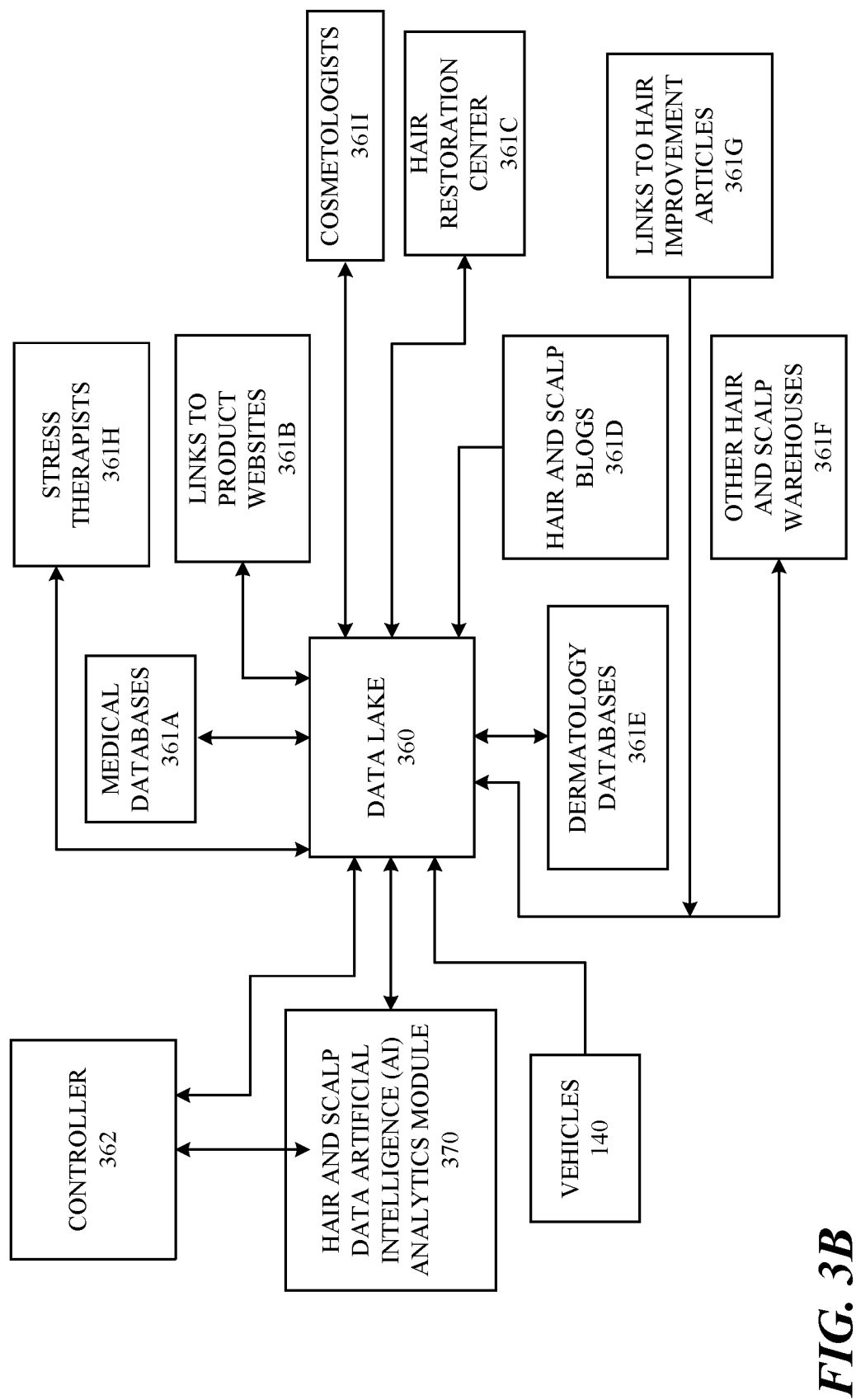
FIG. 3B is a block diagram of the hair and scalp data analytics and data lake accessed by the hair and scalp improvement application, according to certain embodiments.

The hair and scalp analysis module 255 may work in conjunction with hair and scalp improvement application (165, 365, FIG. 1, FIG. 3), which is able to provide more extensive hair and scalp analysis through accessing the data lake 360 and trained hair and scalp data artificial intelligence (AI) analytics module 370 as shown in FIG. 3A. The hair and scalp analysis module 255 may be updated by the hair and scalp improvement application 365.

Within the data center 130, the hair and scalp improvement application 165 has access to a data lake 160 and to the hair and scalp data artificial intelligence (AI) analytics module 170. The hair and scalp data artificial intelligence (AI) analytics module 170 uses algorithms to find subtle relationships in a large set of "training" data, such as hair and scalp parameter data received from connected vehicles 140 (a vehicle having an onboard communications system which is capable of transceiving over LTE, 3G, 4G or 5G is known as a "connected vehicle"). The training process locates those relationships and encodes them into a "model," such as a neural network. The model can then be used to find relationships between inputs similar to those in the training data. The trained model itself may reside anywhere it can receive inputs and provide outputs.

As shown in FIG. 3A, the hair and scalp improvement application 365 may include a controller 362, at least one database 364 including subscriber data, at least one transceiver 366, at least one memory 368 including program instructions, an application processor 371 operatively connected to hair and scalp analysis processor 372 which is configured to use the program instructions to analyze hair and scalp images and image comparisons received from the onboard communications module 210 of a connected vehicle 140 and correlate the information with data received from a data lake 360 of similar hair and scalp images. Hair and scalp data artificial intelligence (AI) analytics module 370 may be configured to search big data by preparing search queries to search the data lake 360 for the causes and treatments for the hair gain/loss and scalp conditions. The data lake 360 may further store the information regarding causes and treatments of the hair gain/loss and scalp conditions. In a non-limiting example, the data lake 360 may store the names of medical or hair and scalp improvement professionals in the home area of the identified driver or passenger. In a further non-limiting example, the data lake 360 may store the names of medical or hair and scalp improvement professionals in the current location of the connected vehicle 140 based on GPS data received from the vehicle. In another non-limiting example, the data lake 360 may store lists of hair improvement products recommended for the hair gain/loss and scalp images of the identified driver or passenger, and provide names of retail outlets in the current or home location which carry the products.

The database 364 can represent one or more local and/or external databases and/or memory 368 communicably coupled to the controller 362. A subscriber database 367 can store a user profile including historical hair and scalp images, parameters or hair and scalp analyses, physicians, hair improvement professionals, hair and scalp treatment centers, hair and scalp regimes, hair and scalp products, and preferred retail outlets of the identified driver or passenger.

The data center 130 can represent one or more servers communicably coupled to the on-board communication module 210. For example, the server can include processing circuitry configured to operate the system 100, receive data from the onboard communication module 210, receive statistical information from the database 364 or subscriber database 367, and the like. The server may include an application server which hosts a web application which performs some or all of the processes of the hair and scalp improvement application. The server may include a communication endpoint or find other endpoints and communicate with those endpoints. The server may share computing resources, such as CPU and random-access memory over a network. The server may be a virtual server or a web server. The cloud network enables the communication between the on-board communication module, satellites or base stations and the at least connected vehicle 140.

The processing circuitry (see application processor 371) of the hair and scalp improvement application 365 residing on the server can carry out instructions to perform or cause performance of various functions, operations, steps or processes of the system 100. The controller 362 and application processor 371 can be configured to store information in memory, operate the system 100, and receive and send information in the form of signals from/to the onboard communication module 210 of the vehicle to control the sensors (204, 206, 208, 234, 235), the camera(s) 231 and 232, the CPU 250. The controller 362 and application processor 371 further command the hair and scalp data artificial intelligence (AI) analytics module 370 to search the data lake 360, where hair and scalp data is extracted, transformed, processed, and provided to the hair and scalp data artificial intelligence (AI) analytics module 370 for analysis. Within the hair and scalp data artificial intelligence (AI) analytics module 370, where data is more refined, the data can be processed with complex algorithms and machine learning to provide the best analysis results to hair and scalp analysis processor 372. The hair and scalp analysis processor 372 may compile the hair and scalp analysis results and make a recommendation as to a treatment for the hair and scalp images at recommendation module 374. The recommendation module 374 combines the analysis with a user profile of the vehicle seat occupant stored in subscriber data 367 to form a treatment recommendation tailored to the vehicle seat occupant. The treatment recommendation is fed back to the controller 362, which transmits the treatment recommendation to the CPU 250 of the vehicle 140. The CPU 250 provides the recommendation as feedback to the occupant and updates the memory 252. If the vehicle occupant has downloaded the hair and scalp improvement application to his/her own smart device, the application may communicate the recommendation back to the smart device by email, messaging, or the like.

The data center 130 may be connected to the onboard communication module 210 through a network. The network can be a public network, such as the Internet, or a private network such as a local area network (LAN) or a wide area network (WAN) network, or any combination thereof and can also include a public switched telephone network (PSTN) or integrated services for digital network (ISDN) sub-networks. The network may be wireless such as a cellular network including EDGE, 3G, 4G, 5G and LTE/LTE-A wireless cellular systems. The wireless network can also be Wi-Fi, Bluetooth, or any other wireless form of communication that as is conventionally known.

The controller 362 of the hair and scalp improvement application 365 receives data communications from the on-board communication module 210 of the vehicle 104. The controller 362 also receives GPS data 212, data entered at graphical user interface 208 and may receive data from the data lake 360. The controller receives the images, parameters and analysis of the hair and scalp of a vehicle occupant. The hair and scalp analysis processor 372 may access the hair and scalp data artificial intelligence (AI) analytics module 370 to generate search queries and send the search queries to the data lake 360 regarding historical and/or predictive information relevant to a type of hair and scalp condition (hair and scalp gain/loss, dandruff, raised scalp portions, or the like). Based on the query, the data lake may return information regarding hair improvement, such causes and treatments related to the hair and scalp conditions. The data lake may also provide product listings, preferred lists of medical professionals, dermatologists, hair and scalp care professionals, and the like.

FIG. 3B depicts how the data lake 360 and hair and scalp data artificial intelligence (AI) analytics module 370 are implemented in the data center 130. The data lake 360 stores the records of all the images of the hair and scalp of vehicle users sourced from the connected vehicles 140, along with recommendations made. The data lake is also connected to a plurality of data warehouses (also shown as 161A-161l), FIG. 1), such as medical databases 361A, links to product websites 361B, hair restoration centers 361C, hair and scalp research blogs 361D and dermatology databases 361E. The data lake may additionally link to hair improvement articles 361G, other hair and scalp warehouses 361F, stress therapists 361H, cosmetologists 361I, or relevant links, which may include websites, new articles, social media, or the like.

The hair and scalp data artificial intelligence (AI) analytics module 370 receives the hair and scalp images, hair and scalp parameter changes and hair and scalp analysis and creates search queries, which are transmitted to the data lake 360. The data lake retrieves the requested information and transmits the information back to the controller 362 for use by the hair and scalp analysis processor 372. The data lake may store hair and scalp data retrieved by the search queries with the records of the hair and scalp images, along with treatments and recommendations made for the hair and scalp conditions.

Figure 4:
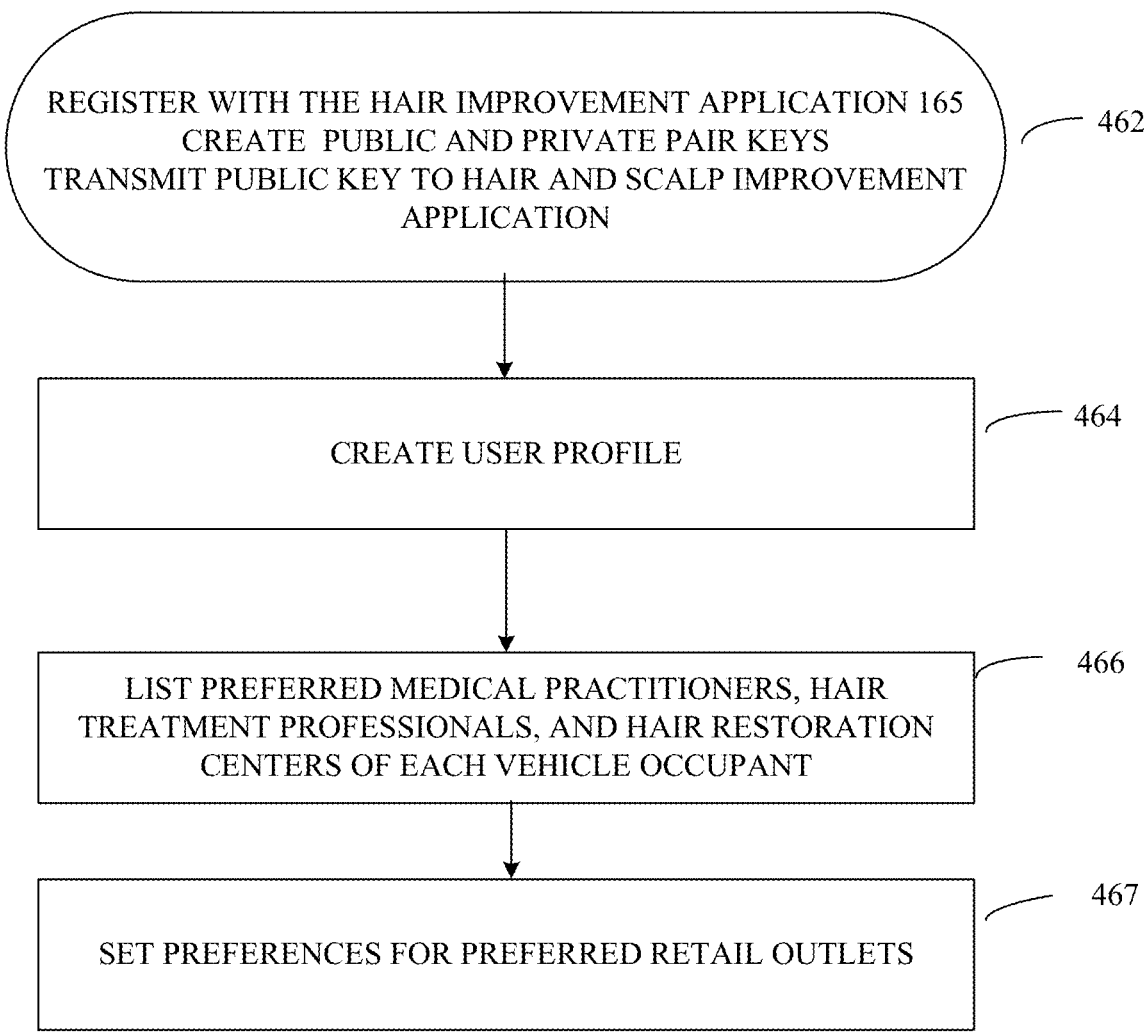
FIG. 4 is an exemplary flowchart of the hair and scalp improvement application registration process, according to certain embodiments.

FIG. 4 describes the process of registering a user with the hair and scalp improvement application 165. Registration 462 may entail downloading the hair and scalp improvement application to a smart computing device of a vehicle user or to the CPU 210 through the onboard communication module 210. Registration comprises the creation of public and private pair keys by the user through the smart computing device, and transmitting the public key to the hair improvement application. Registration may be for a single user, a family or a group of users. In a non-limiting example, the owner of a connected vehicle may register his/her family with the hair and scalp improvement application and set up user profiles for each family member. In a second non-limiting example, a company may offer the hair and scalp improvement application to a group of employees in a wellness program.

Registration 462 with the hair and scalp improvement application 165 may be free or may require a subscription fee. The hair and scalp analysis module 255 may be provided with a new vehicle or may be part of an upgrade purchase.

Each user, such as the owner, driver or a passenger, may create a user profile 464. The user profile may be for a single user, a family or a group of users. The user profile includes the name of the user, age, height, hair type and color, ethnic origins, address, credit card information and known medical or hair and scalp conditions. The user profile may include a fingerprint. A fingerprint may be obtained by a fingerprint reader on the steering wheel or at the user interface 208. The user profile may include a facial image and/or hair and scalp image scan of the user taken at the time of registration, which is taken by the vehicle cameras or uploaded from a computer or smart device of the user. A retinal scan or voice recording of a user may be measured by other sensors 206, which may include a retinal scanner and/or a voice recorder.

A list of preferred medical doctors, dermatologists, hair restoration centers and hair and scalp care professionals of each user is stored at step 466. Additionally, preferences for preferred retail outlets are set. The hair and scalp improvement application 165 may search the marketplace web sites of the preferred retail outlets for recommended hair and scalp products and notify the user of the availability of a hair and scalp care product and compare pricing. The hair and scalp improvement application may ask the user if he/she wishes to purchase the product and perform the purchase for the user.

An additional method for monetization of the hair and scalp improvement computer application includes providing sponsored content to a user of the computer application. The sponsored content is provided for use with the hair and scalp improvement application. A provider of the hair and scalp improvement application is compensated in connection with provisioning the sponsored content for use with the computer application. For example, the hair and scalp improvement application may link the user to preferred medical professionals, dermatologists, hair restoration centers, hair and scalp care professionals, retail outlets carrying hair improvement products or to websites of recommended hair improvement products which have signed a contractual agreement with the provider of the hair and scalp improvement application. The medical professionals, dermatologists, hair restoration centers, hair and scalp care professionals, retail outlets carrying hair improvement products or websites of recommended hair improvement products which have signed a contractual agreement with the provider of the hair and scalp improvement application must register with the hair and scalp improvement application and pay a fee to be placed on the recommended lists. The present disclosure is not limited to the websites, databases and data warehouses 361A-361I listed above and shown in FIG. 3B, which are only a few exemplary instances.

Figure 5:
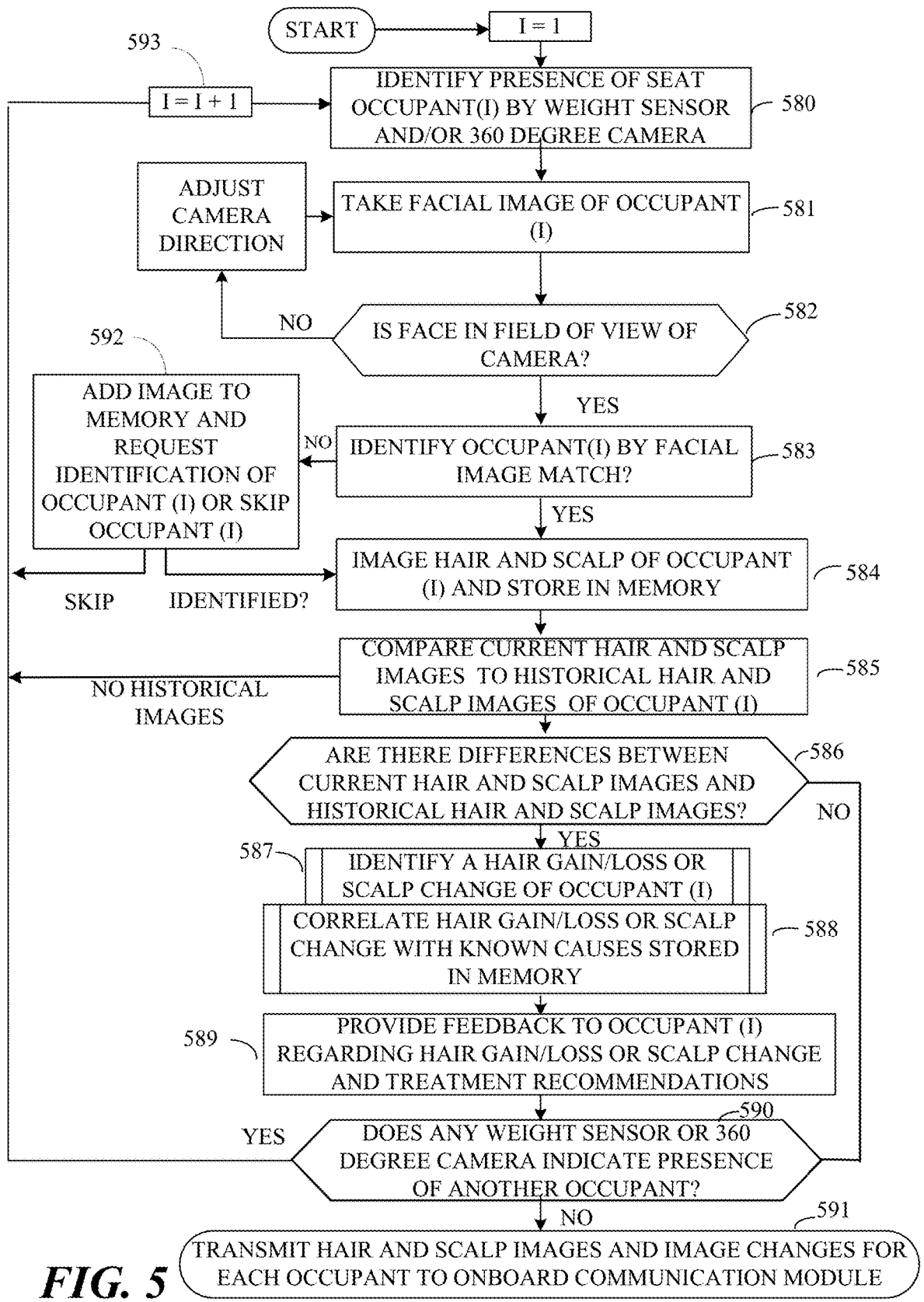
FIG. 5 is an exemplary flowchart of a process for identifying and imaging the hair and scalp of a vehicle occupant, according to certain embodiments.

FIG. 5 illustrates a process for identifying a vehicle occupant residing in a seat of the vehicle. To start the hair and scalp analysis, the presence of a first occupant (I, where I=1) of the vehicle (driver or passengers) is determined by vehicle seat sensors, such as weight sensors 202 or 360 degree camera 231, at step 580. The weight sensor 202 in the vehicle seat signals the presence of a seat occupant (I) in the seat, as illustrated in FIG. 2A, 2B, and triggers an in-vehicle 360 degree camera 231, a first camera $232_1$, or a camera module 233 to take the facial image of the seat occupant (I) at step 581. At step 582, if the face is not in the field of view of the camera, the camera direction may be adjusted and the facial image is retaken. If the face is in the field of view of the camera (step 583), the image is processed by the image processor 256 and compared to stored facial images which identify registered occupants of the vehicle. If a match is not found, the facial image is added to a database in memory 252 and the CPU requests through the user interface display or through audio that the seat occupant (I) provide identifying information at step 592. The driver or the seat occupant may tell the hair and scalp analysis module 255 to skip occupant (I) if he/she is not a person of interest. For example, a driver giving a ride to a friend or a child's playmate may not wish to add the seat occupant (I) to the database or a child or a back seat passenger may not be of interest.

At step 584, the hair and scalp images of seat occupant (I) are then acquired, timestamped and stored in memory 252. At step 585, the current hair and scalp images are compared to historical hair and scalp images of the occupant (I) (those having earlier timestamps than the current hair and scalp images). If there are no historical hair and scalp images for the occupant (I), the process returns to step 593, where (I) is incremented by 1. This step is necessary the first time the seat occupant uses the hair and scalp module. The next time he/she is seated in the vehicle, the hair and scalp analysis can use the saved images and compare them to new (current) hair and scalp images.

At step 586, the process determines whether there are changes between the historical hair and scalp images and the current hair and scalp images. If NO, then the process moves to step 590 to determine whether the sensors detect another seat occupant. If further seat occupants are detected, then the occupant number is incremented and the process returns to step 580. If no further seat occupants are detected, the hair and scalp images of each seat occupant are processed to determine changes in the images and the changes are analyzed to determine hair parameters. The images, changes in images and parameters are stored in memory, and also transmitted to the onboard communication module 210 for further analysis of the causes and treatments of the hair gain/loss and scalp changes by the hair and scalp improvement application 365.

At step 586, if there are changes between the historical hair and scalp images and current hair and scalp images, a hair gain/loss or scalp image change is identified by the image comparison module 257 and sent to the hair and scalp analysis module 255. At step 588, the hair gain/loss or scalp image change is correlated to hair and scalp related parameter changes, such as differences in hair color, texture, brittleness, porosity, thickness, moisture content, oil, number of follicles, scalp crusting, dandruff density, raised or occluded scalp portions. Treatment options may be determined by correlating the changes in the hair and scalp parameters with parameter changes stored in the memory identifying medical problems, dandruff, scalp damage, overexposure to sunlight, etc., which may have contributed to the hair gain/loss or changes in the scalp parameters. At step 589, the hair and scalp analysis module 255 may identify treatment options for the hair and scalp and deliver feedback to the occupant through a speaker 222, the user interface 208, as an SMS message to a cell phone, by an email, or the like.

At step 590, a determination is made as to whether the sensors detect another seat occupant. If further seat occupants are detected, then the seat occupant number is incremented. If no further seat occupants are detected, the current hair and scalp images and parameters of each seat occupant are stored in memory and also transmitted to the onboard communication module for further analysis of causes and treatments by the hair and scalp improvement application 365.

Figure 6:
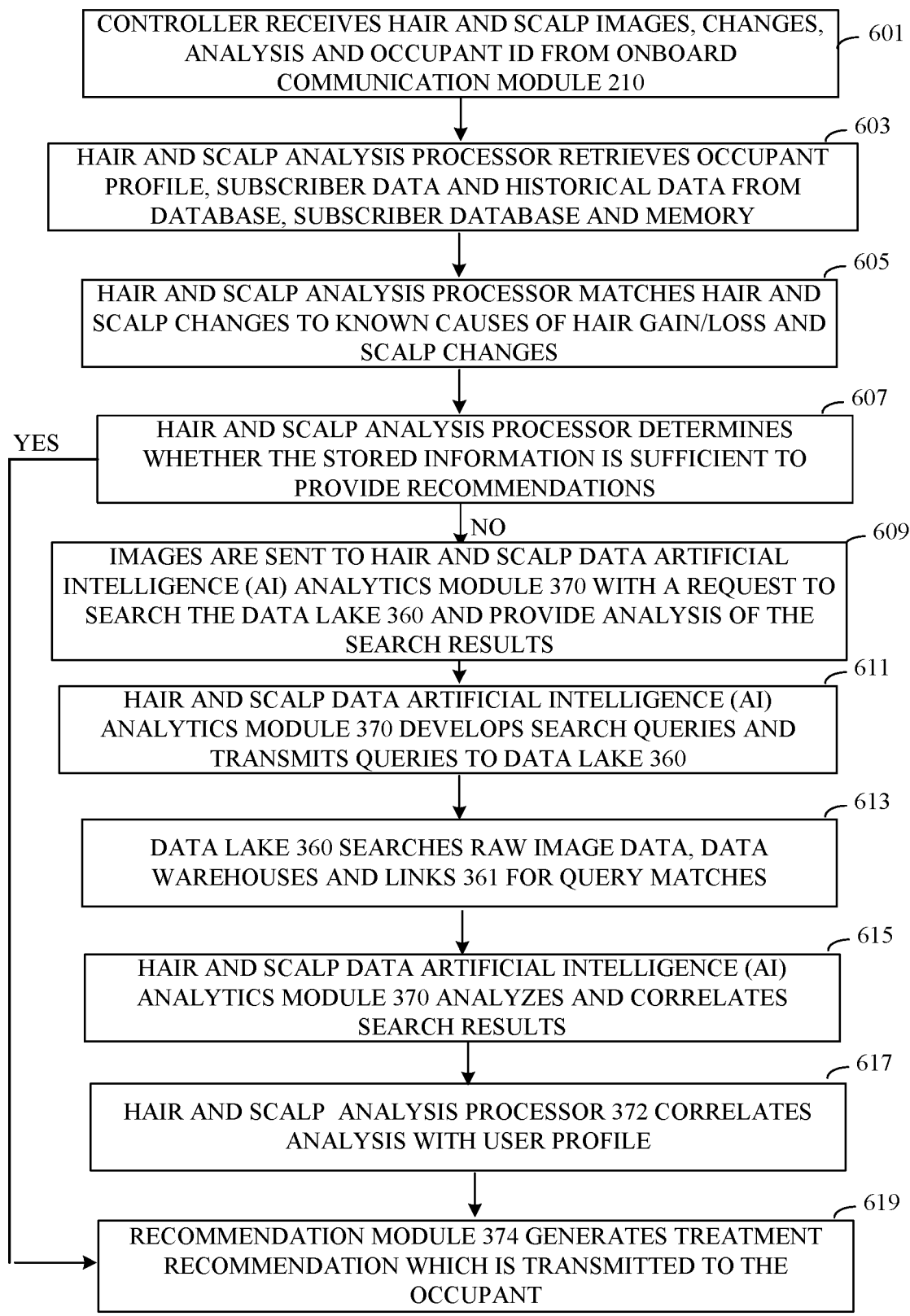
FIG. 6 is an exemplary flowchart of the process by which the body hair and scalp and set of body scan parameters are further analyzed by the hair and scalp improvement application, according to certain embodiments.

FIG. 6 is a flowchart detailing the process by which the hair and scalp images data from vehicle 140 is further analyzed by the hair and scalp improvement application 165 at the data center 130.

At step 601, the controller receives hair and scalp images, the parameter changes, the analysis by hair and scalp analysis module 255 and vehicle seat occupant identification from onboard communication module 210. At step 603, the hair and scalp analysis processor 372 retrieves the vehicle seat occupant profile, subscriber data and historical data from database 364, subscriber database 367 and memory 368 respectively. At step 605, the hair and scalp analysis processor 372 matches the hair and scalp image changes and parameter changes to known causes of hair gain/loss and scalp image and parameter changes stored in database 364. At step 607, the hair and scalp analysis processor determines whether the stored information is sufficient to provide recommendations. If YES, the process moves to step 617 in which treatment recommendations are made. If NO, the process moves to step 609, where the hair and scalp images are sent to hair and scalp data artificial intelligence (AI) analytics module 370 with a request to search the data lake 360 and provide analysis of the search results. At step 611, the hair and scalp data artificial intelligence (AI) analytics module 370 develops search queries and transmits the queries to the data lake 360. At step 613, the data lake 360 searches raw image data, data warehouses and links 361a-361I for query matches. At step 615, the hair and scalp data artificial intelligence (AI) analytics module 370 correlates the search results with the hair and scalp changes, treatment providers and treatment products and provides the analysis to the hair and scalp analysis processor 372. At step 617, the hair and scalp analysis processor 372 correlates search results with the user profile. At step 619, the recommendation module 374 generates a treatment recommendation which is sent to controller 362 for transmission to the vehicle seat occupant and/or CPU 250.

Hair treatment recommendations can include a report of the current hair and scalp, hair gain/loss, scalp changes, causes for the hair gain/loss, treatments of the hair gain/loss and scalp changes and recommendations to hair and scalp care professionals, medical practitioners, hair restoration centers, nutritional supplements and topical products for treating the hair gain/loss and scalp. The hair improvement recommendations may include location and contact information for the hair and scalp care professionals, medical practitioners, hair restoration centers, nutritional supplements and topical products and lists of retail outlets which carry hair improvement products. The location and contact information may be for hair and scalp care professionals, medical practitioners, hair restoration centers, nutritional supplements and topical products and retail outlets located near the home or current location of the vehicle user. The location and contact information may further contain emails or links to websites of the hair and scalp care professionals, medical practitioners, fitness centers and exercise trainers and retail outlets.

The first embodiment is illustrated with respect to FIG. 1 through FIG. 6. The first embodiment describes a method for improving the hair and scalp of a vehicle seat occupant using vehicle cameras, comprising imaging, with at least one vehicle camera 232, the hair and scalp of the vehicle seat occupant each time the vehicle seat occupant sits in a seat of the vehicle, storing the images with timestamps of the images, comparing each current image with at least one stored image having an earlier timestamp, detecting (vehicle computing system, CPU 250, FIG. 2A) between the current image and the at least one stored image having an earlier timestamp, determining hair and scalp parameters related to the changes, accessing hair and scalp data related to the parameters, analyzing the hair and scalp data, accessing hair and scalp treatment options based on the analysis, accessing hair care and scalp care product information based on the analysis, determining a hair and scalp treatment recommendation including the changes in the hair and scalp images, the hair and scalp parameters, the treatment options and the hair and scalp product information; updating a vehicle memory 252, notifying the vehicle seat occupant of the hair and scalp treatment recommendation and transmitting (by onboard communications module 210) the hair and scalp images and hair and scalp parameters to a data lake 360.

The method includes comparing each current image with at least one stored image having an earlier timestamp selected from a range of at least one of greater than two weeks and less than five years, greater than one month and less than three months, and greater than six months and less than one year.

The method alternately includes comparing each current image with at least one stored image having an earlier timestamp until at least one of a change is detected and all hair and scalp images having an earlier timestamp have been compared to the current image.

The method includes recording a sensor signature using at least one of an internal vehicle camera (231 or 232₁, 232₂, . . . , 232ₙ, FIG. 2A), an audio sensor (206), a fingerprint sensor 204, and a retinal sensor (206), identifying the vehicle seat occupant by comparing the sensor signature to a sensor record stored in a user profile.

The method includes imaging the hair and scalp of the vehicle seat occupant by recording images with at least one of a plurality of cameras 232 located above the hair and scalp of the vehicle seat occupant and stitching together the images to generate a composite image of the hair and scalp (see image processor 256).

The method includes illuminating the hair and scalp of the vehicle seat occupant, recording an image with the at least one of the plurality of cameras, timestamping each image and storing each image in the memory of the vehicle.

The hair and scalp treatment recommendation further comprises at least one of at least one of recommending a medical practitioner based on a home location or a current location of the vehicle occupant, recommending a hair and scalp professional based on a home location or a current location of the vehicle occupant, recommending a hair and scalp restoration center based on a home location or a current location of the vehicle occupant, recommending hair improvement products, recommending scalp improvement products, recommending retail web sites of hair or scalp improvement products, recommending retail outlets for hair or scalp improvement products based on a home location or a current location of the vehicle occupant, recommending a dermatologist, recommending a hair loss professional, recommending soothing music for reducing stress, and recommending at least one of a hair improvement regime and a scalp improvement regime.

The vehicle may include a standalone hair and scalp analysis module or may register with a hair and scalp improvement application 365. Registering a vehicle with the hair and scalp improvement application comprises creating a set of public and private pair keys in the vehicle computing system and transmitting the public pair key to the hair and scalp improvement application (step 462, FIG. 4), creating a user profile (step 464) for each vehicle seat occupant including a facial image, the age, the height, hair and scalp conditions, the gender, the ethnic group, the address, credit card information and medical diseases of each vehicle seat occupant, and listing preferred medical practitioners, dermatologists, cosmetologists, hair restoration centers and hair and scalp care professionals and retail outlets for each vehicle occupant (steps 466, 467).

The hair and scalp improvement application performs the steps of accessing hair and scalp data related to the parameters, analyzing the hair and scalp data, accessing treatment options based on the analysis, accessing hair care and scalp care product information based on the analysis, determining a hair and scalp treatment recommendation including the changes in the hair and scalp images, the hair and scalp parameters, the treatment options and the hair and scalp product information and notifying the vehicle seat occupant of the hair and scalp treatment recommendation by transmitting the hair and scalp images and hair and scalp parameters of the vehicle seat occupant to the hair and scalp improvement application by an onboard communications system 210 of the vehicle, receiving, by the hair and scalp improvement application 365, the hair and scalp images and hair and scalp parameters of the vehicle seat occupant (step 601). The hair and scalp improvement application requests a search of the data lake 360 for hair and scalp data related to the hair and scalp images, the changes and the parameters. At step 609-610, receiving the request by a hair and scalp data artificial intelligence (AI) analytics module 370, querying by the hair and scalp data artificial intelligence (AI) analytics module 370, the data lake for information relating to the hair and scalp images, the changes and the parameters, hair and scalp treatment options and hair care and scalp care product information, searching (step 613), within the data lake, unstructured data and structured databases (361A-361I, FIG. 3B) for matches to the query, receiving, by the hair and scalp data artificial intelligence (AI) analytics module 370, the matches to the query. Thereupon analyzing (step 615), by the hair and scalp data artificial intelligence (AI) analytics module 370, the matches to determine hair and scalp conditions, treatment options for the hair and scalp conditions and hair and scalp care product information related to the hair and scalp conditions and receiving, by the hair and scalp analysis application 365, the hair and scalp conditions, the treatment options and the hair and scalp care product information, generating a hair and scalp treatment recommendation (by treatment recommendation module 374) by correlating the hair and scalp conditions, the treatment options and the hair and scalp care product information with the user profile of the vehicle seat occupant (step 617). At step 619, transmitting the hair and scalp treatment recommendation to the onboard communications module of the vehicle and providing the hair and scalp treatment recommendation to the vehicle seat occupant.

The method further includes an alternative method of registering a smart device of the vehicle seat occupant directly with the hair and scalp improvement application, by creating a set of public and private pair keys with the smart device of the vehicle seat occupant, transmitting the public pair key to the hair and scalp improvement application, creating a vehicle seat occupant profile including a facial image, the age, the height, hair and scalp conditions, the gender, the ethnic group, the address, credit card information and medical diseases of the vehicle seat occupant, and listing preferred medical practitioners, dermatologists, cosmetologists, hair restoration centers and hair and scalp care professionals and retail outlets. In this alternative, accessing hair and scalp data related to the parameters, analyzing the hair and scalp data, accessing treatment options based on the analysis; accessing hair care and scalp care product information based on the analysis, determining the hair and scalp treatment recommendation including the changes in the hair and scalp images, the hair and scalp parameters, the treatment options and the hair and scalp product information and notifying the vehicle seat occupant of the hair and scalp treatment recommendation further comprises receiving, by the hair and scalp improvement application, the hair and scalp images and hair and scalp parameters of the vehicle seat occupant from an onboard communications module of the vehicle, requesting, by the hair and scalp improvement application, a search of the data lake for hair and scalp data related to the hair and scalp images, the changes and the parameters, receiving the request by a hair and scalp data artificial intelligence (AI) analytics module, querying, by the hair and scalp data artificial intelligence (AI) analytics module, the data lake for information relating to the hair and scalp images, the changes and the parameters, hair and scalp treatment options and hair care and scalp care product information, searching, within the data lake, unstructured data and structured data for matches to the query, receiving, by the hair and scalp data artificial intelligence (AI) analytics module, the matches to the query, analyzing, by the hair and scalp data artificial intelligence (AI) analytics module, the matches to determine hair and scalp conditions, treatment options for the hair and scalp conditions and hair and scalp care product information related to the hair and scalp conditions, receiving, by the hair and scalp analysis application, the hair and scalp conditions, the treatment options and the hair and scalp care product information, generating the hair and scalp treatment recommendation by correlating the hair and scalp conditions, the treatment options and the hair and scalp care product information with the user profile of the vehicle seat occupant, and transmitting the hair and scalp treatment recommendation to the smart device of the vehicle seat occupant.

The second embodiment is illustrated with respect to FIG. 1 through FIG. 6. The second embodiment describes a system for improving the hair and scalp of a vehicle seat occupant using vehicle cameras, comprising a plurality of vehicles ($140_1$-$140_n$, FIG. 1), each vehicle including a plurality of vehicle seat occupants; at least one camera ($232_1$, $232_2$, . . . , $232_n$, FIG. 2A) located above the hair and scalp of each of the vehicle seat occupants, wherein the at least one camera is configured for imaging the hair and scalp of the vehicle seat occupant, and at least one sensor (360 degree camera 231, fingerprint sensors 204, other sensors 206, user interface 208) for recording a sensor signature of each of the vehicle seat occupants.

The system further includes a CPU 250 operatively connected with the at least one camera 232 and the at least one sensor, a vehicle memory 252 including a user profile for each vehicle seat occupant and a data record of the hair and scalp images of each vehicle seat occupant, an image processor 251 configured to receive the hair and scalp images, timestamp the images and store the hair and scalp images and timestamps of the hair and scalp images in the vehicle memory 252, an identity module 254 configured to identify a vehicle seat occupant by matching the sensor signature of each vehicle seat occupant to a sensor signature stored in the user profile of the respective vehicle seat occupant, a hair and scalp image comparison module 253 configured to compare current hair and scalp images of each vehicle occupant with stored hair and scalp images of the respective vehicle seat occupant having previous timestamps and to detect changes in the hair and scalp images, a hair and scalp analysis module 255 configured to determine hair and scalp parameters from the changes in the hair and scalp images, a user interface 208 configured to communicate with each vehicle seat occupant, an onboard communications module 210 configured for transmitting a data packet including the hair and scalp images, hair and scalp parameters, identity and the user profile of each vehicle seat occupant and further configured for receiving treatment recommendations and updates.

The system further includes a hair and scalp improvement application (365, FIG. 3A) including a transceiver 366 configured to receive the data packet from each respective onboard communications module 210 of each of the plurality of vehicles 140, an application processor 371 configured to request a search for information related to the changes in the hair and scalp images and the hair and scalp parameters of each vehicle seat occupant, a hair and scalp analysis processor 372, a database 367 including subscriber data, an application memory 368 configured to store the identity and the user profile of each vehicle seat occupant, a registration module 363, and a treatment recommendation module 374, a controller 362 operatively connected to the transceiver, the application processor, the hair and scalp analysis processor, the database, the application memory, the registration module and the treatment recommendation module.

The system further includes a hair and scalp data artificial intelligence (AI) analytics module 370 configured to receive search requests from the application processor and to form search queries to retrieve information relating to the changes in the hair and scalp images and the parameters, hair and scalp treatment options and hair care and scalp care products, and a data lake 360 configured to search unstructured data and structured data for the information and to transmit the information to the hair and scalp data artificial intelligence (AI) analytics module. The hair and scalp data artificial intelligence (AI) analytics module 370 is further configured to receive the information, analyze the matches to determine a hair and scalp condition, treatment options for the hair and scalp condition and hair and scalp care product information related to the hair and scalp condition and transmit the analysis to the hair and scalp analysis processor.

The hair and scalp analysis processor 372 is configured to correlate the hair and scalp condition, treatment options for the hair and scalp condition and hair and scalp care product information with the user profile of each vehicle seat occupant.

The treatment recommendation module 374 is configured to generate a hair and scalp treatment recommendation for each vehicle seat occupant, wherein the transceiver 366 is configured to transmit the hair and scalp treatment recommendation of each vehicle seat occupant to the respective onboard communications module 210 of the respective vehicle 140, and wherein the CPU 250 provides the hair and scalp treatment recommendation to the respective vehicle seat occupant of the respective vehicle and updates the vehicle memory.

The hair and scalp treatment recommendation further comprises recommending at least one of a medical practitioner based on a home location or a current location of the vehicle seat occupant, a hair and scalp professional based on a home location or a current location of the vehicle seat occupant, a hair and scalp restoration center based on a home location or a current location of the vehicle seat occupant, hair improvement products, scalp improvement products, retail websites of hair or scalp improvement products, retail outlets for hair or scalp improvement products based on a home location or a current location of the vehicle seat occupant, a dermatologist, a hair loss professional, soothing music for reducing stress, and at least one of a hair improvement regime and scalp improvement regime.

The hair and scalp improvement application further comprises a registration module 363 configured to register each of the plurality of vehicles with the hair and scalp improvement application, wherein the application memory 368 includes a first database 367 of subscriber information, the subscriber information including the user profile for each vehicle seat occupant, the user profile including a facial image, the age, the height, hair and scalp conditions, the gender, the ethnic group, the address, credit card information and medical diseases of each respective vehicle seat occupant, a second database 364 including preference lists of medical practitioners, dermatologists, cosmetologists, hair restoration centers and hair and scalp care professionals and retail outlets of each respective vehicle seat occupant, wherein the hair and scalp improvement application further correlates the subscriber information and preference lists with the hair and scalp related information in determining the hair and scalp treatment recommendation of each respective vehicle seat occupant.

The system further comprises a camera module (233, FIG. 2B) located above the hair and scalp of each vehicle seat occupant, the camera module including an array of cameras (cameras 232 in FIG. 2C; 232 and NIR cameras $237_1$ to $237_m$ in FIG. 2D), the array of cameras including at least one of a visible light camera 232, a near infrared camera 237, a scanning camera 241 (FIG. 2E), at least one light source 236, a housing shaped to hold the array of cameras and the at least one light source in a configuration which directs a field of view of each camera to a different area of the hair and scalp of the vehicle seat occupant.

The CPU is configured to actuate each camera and an associated light source sequentially to image the each different area of the hair and scalp of the vehicle seat occupant, wherein the image processor is configured to stitch together the images and generate a composite picture of the hair and scalp.

The registration module 363 is further configured to register a smart device of a vehicle seat occupant travelling in any one of the plurality of vehicles, with the hair and scalp improvement application 365 by receiving a public key from the smart device of the vehicle seat occupant, receive a vehicle seat occupant user profile including a facial image, an age, a height, hair and scalp conditions, a gender, an ethnic group, an address, a credit card number and any medical diseases of the vehicle seat occupant, and receive lists of preferred medical practitioners, dermatologists, hair loss professionals, hair restoration centers and scalp care professionals and retail outlets of the vehicle seat occupant, and store the public key, user profile and lists in the subscriber database.

The hair and scalp improvement application further includes a transceiver 366 configured to receive the hair and scalp images and hair and scalp parameters of the registered vehicle seat occupant from an onboard communication module 210 of the respective vehicle 140, a hair and scalp analysis processor 372 configured to request a search for information related to the hair and scalp images and changes in hair and scalp parameters of the respective vehicle seat occupant from the hair and scalp data artificial intelligence (AI) analytics module 370, wherein the hair and scalp data artificial intelligence (AI) analytics module is configured to receive hair and scalp information requests, form search queries and transmit the search queries to the data lake 360.

The transceiver 366 is further configured to transmit the search queries to the data lake 360 to retrieve information relating to the hair and scalp images and changes in hair and scalp parameter, wherein the data lake is configured to receive the search queries, and search unstructured data and structured data 361A-361I for matches to the query.

The hair and scalp data artificial intelligence (AI) analytics module 370 is further configured to receive the information from the data lake, analyze the matches to determine a hair and scalp condition, treatment options for the hair and scalp condition and hair and scalp care product information related to the hair and scalp condition and transmit the analysis to the hair and scalp analysis processor 372.

The hair and scalp analysis processor 372 is configured to correlate the hair and scalp condition, treatment options for the hair and scalp condition and hair and scalp care product information with the user profile of each vehicle seat occupant.

The treatment recommendation module is configured to generate a hair and scalp treatment recommendation for each vehicle seat occupant and the transceiver is configured to transmit the hair and scalp treatment recommendation to the smart device of the vehicle seat occupant.

The data lake 360 is further configured to store the hair and scalp images, the changes in hair and scalp parameters, the hair and scalp information and the hair and scalp treatment recommendations of each of the respective vehicle seat occupants of each of the plurality of vehicles.

The plurality of cameras may be contained in a camera module 233 located above the hair and scalp of each vehicle seat occupant, the camera module including an array of cameras, the array of cameras including at least one of a visible light camera 232, a near infrared camera 237 and a scanning camera 241, at least one light source 236, a housing shaped to hold the array of cameras and the at least one light source in a configuration which directs a field of view of each camera to a different area of the hair and scalp of the vehicle seat occupant.

The CPU 250 is further configured to actuate each camera and an associated light source sequentially to image each different area of the hair and scalp of the vehicle seat occupant, and the image processor is configured to stitch the images together and generate a composite picture of the hair and scalp.

The third embodiment is illustrated with respect to FIG. 1 through FIG. 10. The third embodiment describes a non-transitory computer readable medium having instructions stored therein that, when executed by one or more processor, cause the one or more processors to perform a method for improving the hair and scalp of a vehicle seat occupant using vehicle cameras, comprising imaging, with at least one vehicle camera 232, the hair and scalp of the vehicle seat occupant each time the vehicle seat occupant sits in a seat of the vehicle, storing the images with timestamps of the images, comparing each current image with at least one stored image having an earlier timestamp, detecting (vehicle computing system, CPU 250, FIG. 2A) between the current image and the at least one stored image having an earlier timestamp, determining hair and scalp parameters related to the changes, accessing hair and scalp data related to the parameters, analyzing the hair and scalp data, accessing hair and scalp treatment options based on the analysis, accessing hair care and scalp care product information based on the analysis, determining a hair and scalp treatment recommendation including the changes in the hair and scalp images, the hair and scalp parameters, the treatment options and the hair and scalp product information; updating a vehicle memory 252, notifying the vehicle seat occupant of the hair and scalp treatment recommendation and transmitting (by onboard communications module 210) the hair and scalp images and hair and scalp parameters to a data lake 360.

The non-transitory computer readable medium method further comprises registering the vehicle with the hair and scalp improvement application by creating a set of public pair key and private pair key in the vehicle computing system and transmitting the public pair key to the hair and scalp improvement application (step 462, FIG. 4), creating a user profile (step 464) for each vehicle seat occupant including a facial image, an age, a height, a hair and scalp condition, a gender, an ethnic group, an address, a credit card and one or more medical diseases of each vehicle seat occupant, and listing preferred medical practitioners, dermatologists, cosmetologists, hair restoration centers and hair and scalp care professionals and retail outlets for each vehicle occupant (steps 466, 467).

The non-transitory computer readable medium method further comprises wherein the hair and scalp improvement application performs the steps of accessing hair and scalp data related to the parameters, analyzing the hair and scalp data, accessing treatment options based on the analysis, accessing hair care and scalp care product information based on the analysis, determining the hair and scalp treatment recommendation including the changes in the hair and scalp images, the hair and scalp parameters, the treatment options and the hair and scalp product information and notifying the vehicle seat occupant of the hair and scalp treatment recommendation by transmitting the hair and scalp images and hair and scalp parameters of the vehicle seat occupant to the hair and scalp improvement application by an onboard communications system 210 of the vehicle, receiving, by the hair and scalp improvement application 365, the hair and scalp images and hair and scalp parameters of the vehicle seat occupant (step 601). The hair and scalp improvement application requests a search of the data lake 360 for hair and scalp data related to the hair and scalp images, the changes and the parameters. At step 609-610, receiving the request by a hair and scalp data AI analytics module 370, querying, by the hair and scalp data artificial intelligence (AI) analytics module, the data lake for information relating to the hair and scalp images, the changes and the parameters, hair and scalp treatment options and hair care and scalp care product information, searching (step 613), within the data lake, unstructured data and structured databases (361A-361I, FIG. 3B) for matches to the query, receiving, by the hair and scalp data artificial intelligence (AI) analytics module, the matches to the query. Thereupon analyzing (step 615), by the hair and scalp data artificial intelligence (AI) analytics module 370, the matches to determine hair and scalp conditions, treatment options for the hair and scalp conditions and hair and scalp care product information related to the hair and scalp conditions and receiving, by the hair and scalp analysis application 365, the hair and scalp conditions, the treatment options and the hair and scalp care product information, generating a hair and scalp treatment recommendation (at recommendation module 374) by correlating the hair and scalp conditions, the treatment options and the hair and scalp care product information with the user profile of the vehicle seat occupant (step 617). At step 619, transmitting the hair and scalp treatment recommendation to the onboard communications module of the vehicle and providing the hair and scalp treatment recommendation to the vehicle seat occupant.

Figure 7:
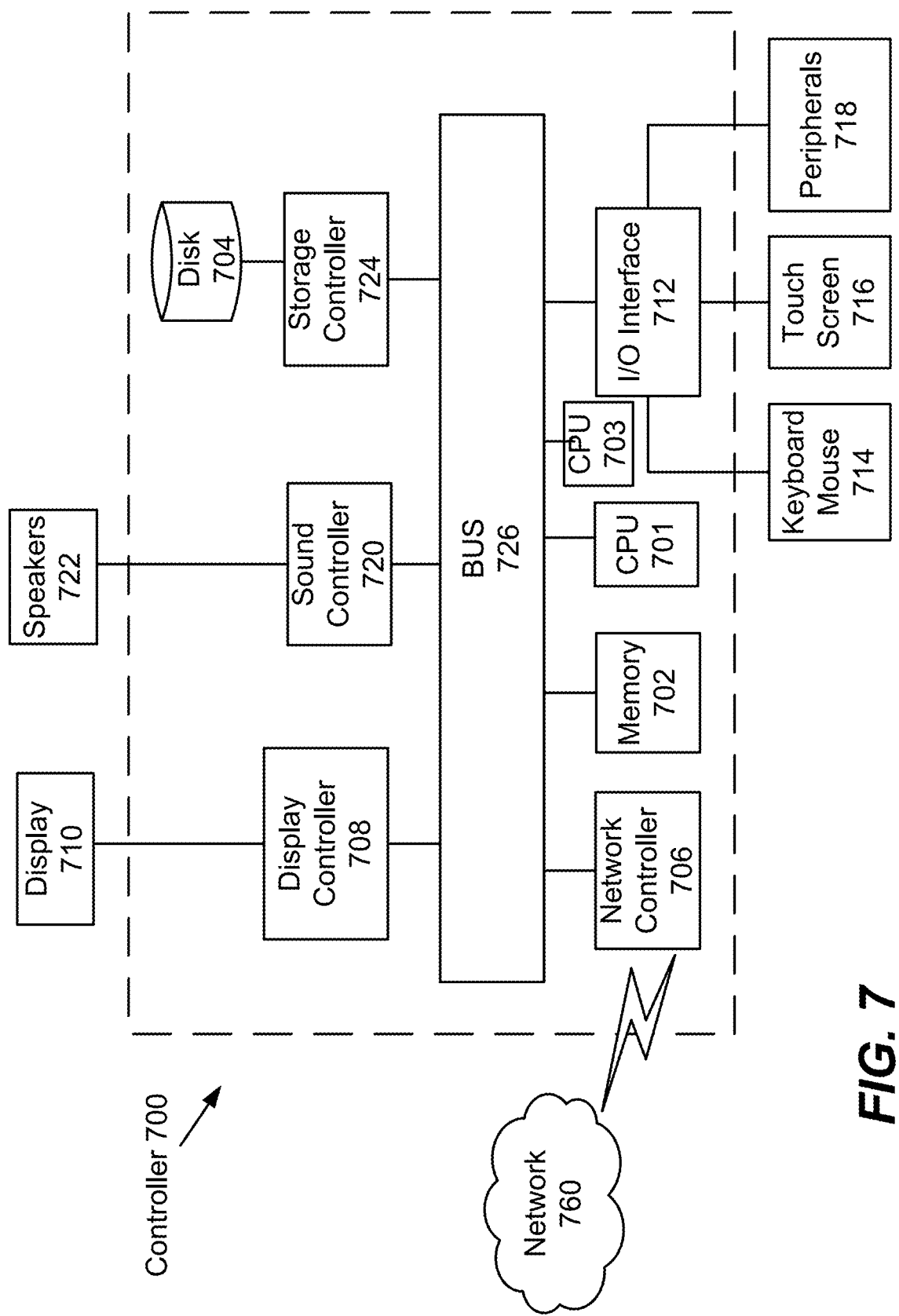
FIG. 7 is an illustration of a non-limiting example of details of computing hardware used in the computing systems, according to certain embodiments.

Next, further details of the hardware description of the computing environments of FIG. 1-6 according to exemplary embodiments are described with reference to FIG. 7. In FIG. 7, a controller 700 is described which is representative of the controller 250 of FIG. 1 or the controller 362 of FIG. 3A in which the controller 700 is a computing device which includes a CPU 701 which performs the processes described above/below. The process data and instructions may be stored in memory 702. These processes and instructions may also be stored on a storage medium disk 704 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device communicates, such as a server or computer.

Further, the claims may be provided as a utility application, background daemon, or component of an operating system, or combination thereof, executing in conjunction with CPU 701, 703 and an operating system such as Microsoft Windows 7, UNIX, Solaris, LINUX, Apple MAC-OS and other systems known to those skilled in the art.

The hardware elements in order to achieve the computing device may be realized by various circuitry elements, known to those skilled in the art. For example, CPU 701 or CPU 703 may be a Xenon or Core processor from Intel of America or an Opteron processor from AMD of America, or may be other processor types that would be recognized by one of ordinary skill in the art. Alternatively, the CPU 701, 703 may be implemented on an FPGA, ASIC, PLD or using discrete logic circuits, as one of ordinary skill in the art would recognize. Further, CPU 701, 703 may be implemented as multiple processors cooperatively working in parallel to perform the instructions of the inventive processes described above.

The computing device in FIG. 7 also includes a network controller 706, such as an Intel Ethernet PRO network interface card from Intel Corporation of America, for interfacing with network 760. As can be appreciated, the network 760 can be a public network, such as the Internet, or a private network such as an LAN or WAN network, or any combination thereof and can also include PSTN or ISDN sub-networks. The network 760 can also be wired, such as an Ethernet network, or can be wireless such as a cellular network including EDGE, 3G, 4G and 5G wireless cellular systems. The wireless network can also be Wi-Fi, Bluetooth, or any other wireless form of communication that is known.

The computing device may further include a display controller 708, such as a NVIDIA GeForce GTX or Quadro graphics adaptor from NVIDIA Corporation of America for interfacing with display 710, such as a Hewlett Packard HPL2445w LCD monitor. A general purpose I/O interface 712 interfaces with a keyboard and/or mouse 714 as well as a touch screen panel 716 on or separate from display 710. General purpose I/O interface also connects to a variety of peripherals 718 including printers and scanners, such as an OfficeJet or DeskJet from Hewlett Packard.

A sound controller 720 is also provided in the computing device such as Sound Blaster X-Fi Titanium from Creative, to interface with speakers/microphone 722 thereby providing sounds and/or music.

The general purpose storage controller 724 connects the storage medium disk 704 with communication bus 726, which may be an ISA, EISA, VESA, PCI, or similar, for interconnecting all of the components of the computing device. A description of the general features and functionality of the display 710, keyboard and/or mouse 714, as well as the display controller 708, storage controller 724, network controller 706, sound controller 720, and general purpose I/O interface 712 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
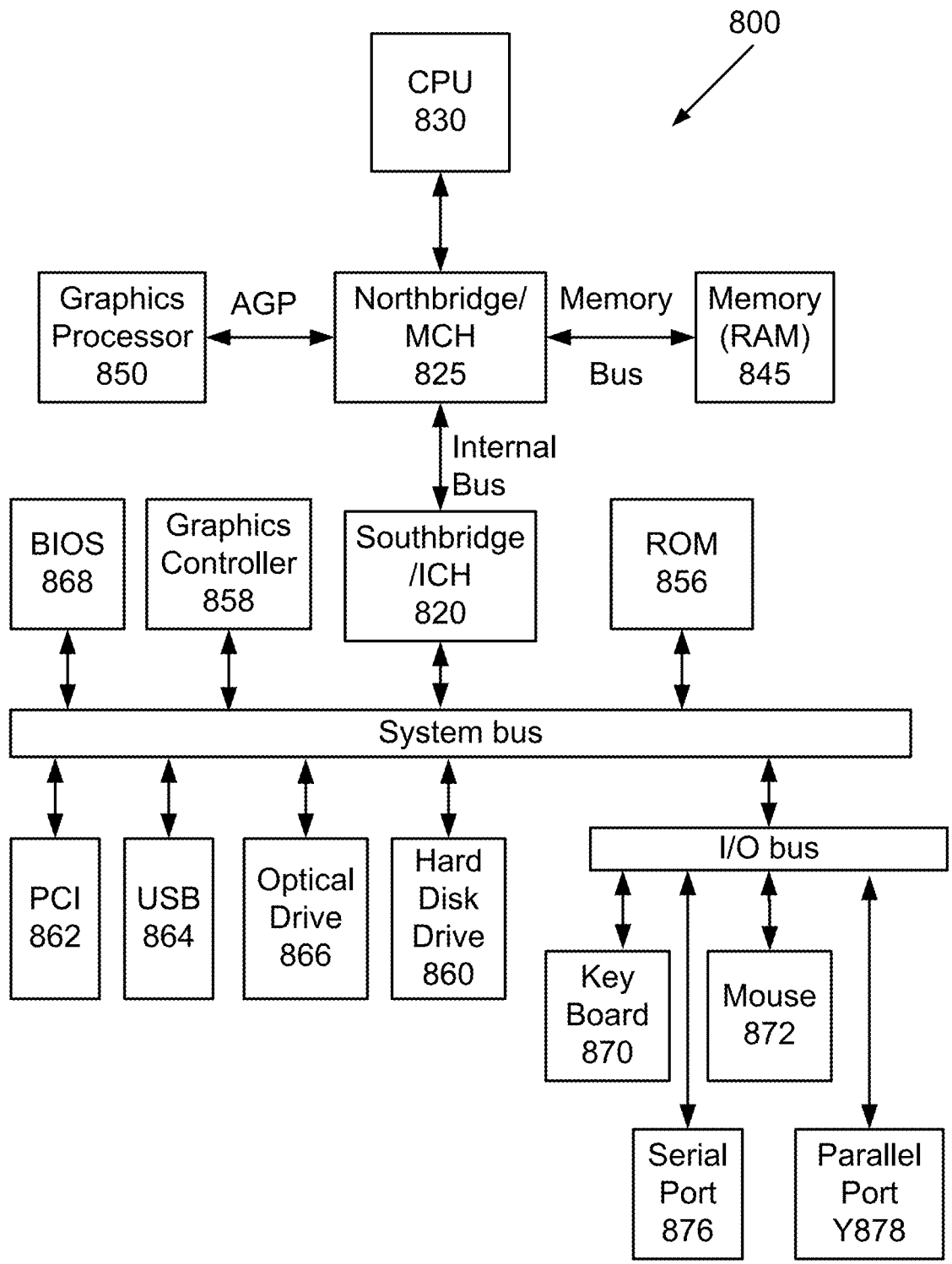
FIG. 8 is an exemplary schematic diagram of a data processing system used within the computing system, according to certain embodiments.

FIG. 8 shows a schematic diagram of a data processing system, according to certain embodiments, for performing the functions of the exemplary embodiments. The data processing system is an example of a computer in which code or instructions implementing the processes of the illustrative embodiments may be located.

In FIG. 8, data processing system 800 employs a hub architecture including a north bridge and memory controller hub (NB/MCH) 825 and a south bridge and input/output (I/O) controller hub (SB/ICH) 820. The central processing unit (CPU) 830 is connected to NB/MCH 825. The NB/MCH 825 also connects to the memory 845 via a memory bus, and connects to the graphics processor 850 via an accelerated graphics port (AGP). The NB/MCH 825 also connects to the SB/ICH 820 via an internal bus (e.g., a unified media interface or a direct media interface). The CPU Processing unit 830 may contain one or more processors and even may be implemented using one or more heterogeneous processor systems.

Figure 9:
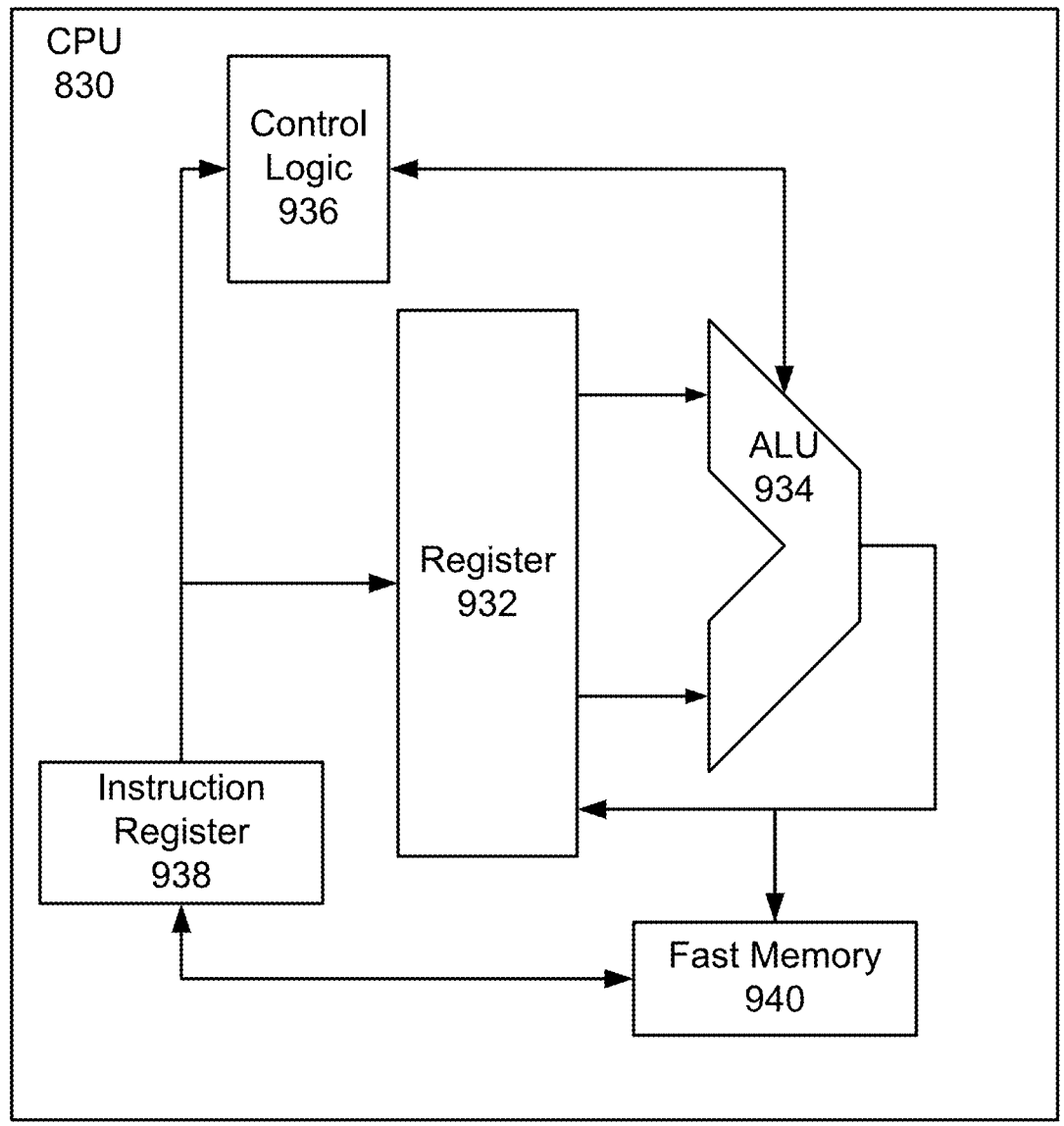
FIG. 9 is an exemplary schematic diagram of a processor used with the computing system, according to certain embodiments.

For example, FIG. 9 shows one implementation of CPU 830. In one implementation, the instruction register 938 retrieves instructions from the fast memory 940. At least part of these instructions are fetched from the instruction register 938 by the control logic 936 and interpreted according to the instruction set architecture of the CPU 830. Part of the instructions can also be directed to the register 932. In one implementation the instructions are decoded according to a hardwired method, and in another implementation the instructions are decoded according a microprogram that translates instructions into sets of CPU configuration signals that are applied sequentially over multiple clock pulses. After fetching and decoding the instructions, the instructions are executed using the arithmetic logic unit (ALU) 934 that loads values from the register 932 and performs logical and mathematical operations on the loaded values according to the instructions. The results from these operations can be feedback into the register and/or stored in the fast memory 940. According to certain implementations, the instruction set architecture of the CPU 830 can use a reduced instruction set architecture, a complex instruction set architecture, a vector processor architecture, a very large instruction word architecture. Furthermore, the CPU 830 can be based on the Von Neuman model or the Harvard model. The CPU 830 can be a digital signal processor, an FPGA, an ASIC, a PLA, a PLD, or a CPLD. Further, the CPU 830 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 820 is coupled through a system bus to an I/O Bus, a read only memory (ROM) 856, universal serial bus (USB) port 864, a flash binary input/output system (BIOS) 868, and a graphics controller 858. PCI/PCIe devices can also be coupled to SB/ICH 888 through a PCI bus 862.

The PCI devices may include, for example, Ethernet adapters, add-in cards, and PC cards for notebook computers. The Hard disk drive 860 and CD-ROM 866 can use, for example, an integrated drive electronics (IDE) or serial advanced technology attachment (SATA) interface. In one implementation the I/O bus can include a super I/O (SIO) device.

Further, the hard disk drive (HDD) 860 and optical drive 866 can also be coupled to the SB/ICH 820 through a system bus. In one implementation, a keyboard 870, a mouse 872, a parallel port 878, and a serial port 876 can be connected to the system bus through the I/O bus. Other peripherals and devices that can be connected to the SB/ICH 820 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
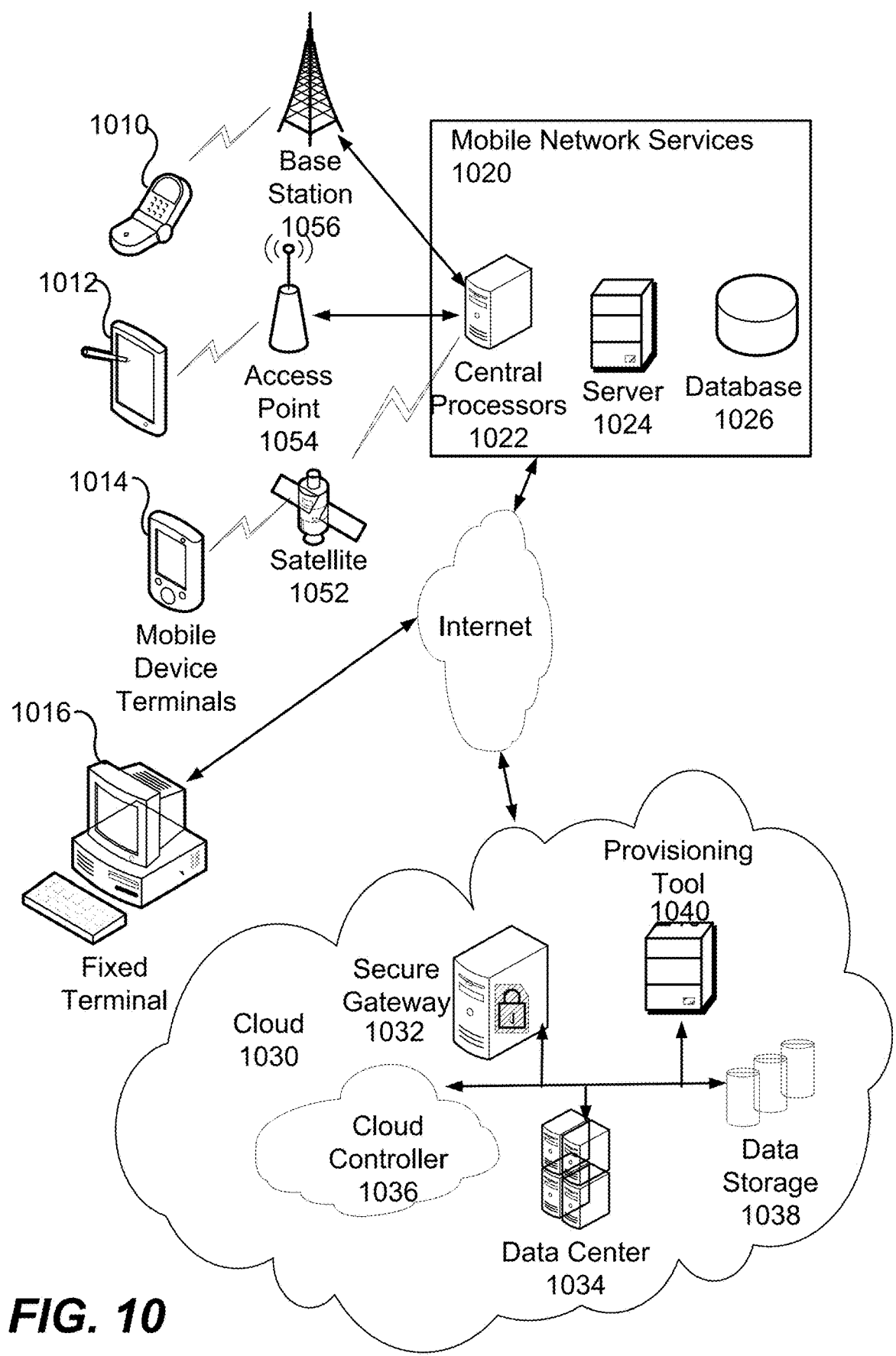
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, which may share processing, as shown by FIG. 10, in addition to various person interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A method for improving the hair and scalp of a vehicle seat occupant using vehicle cameras, comprising:
imaging the hair and scalp of a vehicle seat occupant by at least one vehicle camera each time the vehicle seat occupant sits in a seat of the vehicle;
storing the images with timestamps of the images;
comparing each current image with at least one stored image having an earlier timestamp;
detecting changes between the current image and the at least one stored image having an earlier timestamp;
determining hair and scalp parameters related to the changes;
accessing hair and scalp data related to the parameters;
analyzing the hair and scalp data;
accessing hair and scalp treatment options based on the analysis;
accessing hair care and scalp care product information based on the analysis;
determining a hair and scalp treatment recommendation including the changes in the hair and scalp images, the hair and scalp parameters, the treatment options and the hair and scalp product information;
updating a vehicle memory;
notifying the vehicle seat occupant of the hair and scalp treatment recommendation; and
transmitting the hair and scalp images and hair and scalp parameters to a data lake.

2. The method of claim 1, further comprising:
comparing each current image with at least one stored image having an earlier timestamp selected from a range of at least one of:
greater than two weeks and less than five years;
greater than one month and less than three months; and
greater than six months and less than one year.

3. The method of claim 1, further comprising:
comparing each current image with at least one stored image having an earlier timestamp until at least one of a change is detected and all hair and scalp images having an earlier timestamp have been compared to the current image.

4. The method of claim 1, further comprising:
recording a sensor signature using at least one of an internal vehicle camera, an audio sensor, a fingerprint sensor, and a retinal sensor; and
identifying the vehicle seat occupant by comparing the sensor signature to a sensor record stored in a user profile.

5. The method of claim 1, further comprising:
imaging the hair and scalp of the vehicle seat occupant by recording images with at least one of a plurality of cameras located above the hair and scalp of the vehicle seat occupant; and
stitching together the images to generate a composite image of the hair and scalp.

6. The method of claim 5, wherein imaging the hair and scalp of the vehicle seat occupant by recording images with the at least one of a plurality of cameras further comprises:
illuminating the hair and scalp of the vehicle seat occupant;
recording an image with the at least one of the plurality of cameras;
timestamping each image; and
storing each image in the memory of the vehicle.

7. The method of claim 1, wherein the hair and scalp treatment recommendation further comprises at least one of:
recommending a medical practitioner based on a home location or a current location of the vehicle seat occupant;
recommending a hair and scalp professional based on a home location or a current location of the vehicle seat occupant;
recommending a hair and scalp restoration center based on a home location or a current location of the vehicle seat occupant;
recommending hair improvement products;
recommending scalp improvement products;
recommending retail websites of hair or scalp improvement products;
recommending retail outlets for hair or scalp improvement products based on a home location or a current location of the vehicle seat occupant;
recommending a dermatologist;
recommending a hair loss professional;
recommending soothing music for reducing stress; and
recommending at least one of a hair improvement regime and a scalp improvement regime.

8. The method of claim 1, further comprising:
registering the vehicle with a hair and scalp improvement application by creating a set of public and private pair keys in a vehicle computing system of the vehicle;
transmitting the public pair key to the hair and scalp improvement application;
creating a user profile for each vehicle seat occupant including a facial image, an age, a height, hair and scalp conditions, a gender, an ethnic group, an address, a credit card number and any medical diseases of the vehicle seat occupant; and
providing lists of preferred medical practitioners, dermatologists, hair loss professionals, hair restoration centers and scalp care professionals and retail outlets for each vehicle seat occupant.

9. The method of claim 8, wherein accessing hair and scalp data related to the parameters, analyzing the hair and scalp data, accessing treatment options based on the analysis; accessing hair care and scalp care product information based on the analysis, determining a hair and scalp treatment recommendation including the changes in the hair and scalp images, the hair and scalp parameters, the treatment options and the hair and scalp product information and notifying the vehicle seat occupant of the hair and scalp treatment recommendation further comprises:
transmitting the hair and scalp images and hair and scalp parameters of the vehicle seat occupant to the hair and scalp improvement application by an onboard communications system of the vehicle;
receiving, by the hair and scalp improvement application, the hair and scalp images and hair and scalp parameters of the vehicle seat occupant;
requesting, by the hair and scalp improvement application, a search of the data lake for hair and scalp data related to the hair and scalp images, the changes and the parameters;
receiving the request by a hair and scalp data artificial intelligence (AI) analytics module;
querying, by the hair and scalp data artificial intelligence (AI) analytics module, the data lake for information relating to the hair and scalp images, the changes and the parameters, hair and scalp treatment options and hair care and scalp care product information;

searching, within the data lake, unstructured data and structured data for matches to the query;
receiving, by the hair and scalp data artificial intelligence (AI) analytics module, the matches to the query;
analyzing, by the hair and scalp data artificial intelligence (AI) analytics module, the matches to determine hair and scalp conditions, treatment options for the hair and scalp conditions and hair and scalp care product information related to the hair and scalp conditions;
receiving, by the hair and scalp analysis application, the hair and scalp conditions, the treatment options and the hair and scalp care product information;
generating the hair and scalp treatment recommendation by correlating the hair and scalp conditions, the treatment options and the hair and scalp care product information with the user profile of the vehicle seat occupant;
transmitting the hair and scalp treatment recommendation to the onboard communications module of the vehicle; and
providing the hair and scalp treatment recommendation to the vehicle seat occupant.

10. The method of claim 1, further comprising:
registering a smart device of the vehicle seat occupant with a hair and scalp improvement application;
creating a set of public and private pair keys with the smart device of the vehicle seat occupant;
transmitting the public pair key to the hair and scalp improvement application;
creating a vehicle seat occupant profile including a facial image, the age, the height, hair and scalp conditions, the gender, the ethnic group, the address, credit card information and medical diseases of the vehicle seat occupant; and
listing preferred medical practitioners, dermatologists, cosmetologists, hair restoration centers and hair and scalp care professionals and retail outlets.

11. The method of claim 10, wherein accessing hair and scalp data related to the parameters, analyzing the hair and scalp data, accessing treatment options based on the analysis; accessing hair care and scalp care product information based on the analysis, determining the hair and scalp treatment recommendation including the changes in the hair and scalp images, the hair and scalp parameters, the treatment options and the hair and scalp product information and notifying the vehicle seat occupant of the hair and scalp treatment recommendation further comprises:
receiving, by the hair and scalp improvement application, the hair and scalp images and hair and scalp parameters of the vehicle seat occupant from an onboard communications module of the vehicle;
requesting, by the hair and scalp improvement application, a search of the data lake for hair and scalp data related to the hair and scalp images, the changes and the parameters;
receiving the request by a hair and scalp data artificial intelligence (AI) analytics module;
querying, by the hair and scalp data artificial intelligence (AI) analytics module, the data lake for information relating to the hair and scalp images, the changes and the parameters, hair and scalp treatment options and hair care and scalp care product information;
searching, within the data lake, unstructured data and structured data for matches to the query;
receiving, by the hair and scalp data artificial intelligence (AI) analytics module, the matches to the query;
analyzing, by the hair and scalp data artificial intelligence (AI) analytics module, the matches to determine hair and scalp conditions, treatment options for the hair and scalp conditions and hair and scalp care product information related to the hair and scalp conditions;
receiving, by the hair and scalp analysis application, the hair and scalp conditions, the treatment options and the hair and scalp care product information;
generating a hair and scalp treatment recommendation by correlating the hair and scalp conditions, the treatment options and the hair and scalp care product information with the user profile of the vehicle seat occupant; and
transmitting the hair and scalp treatment recommendation to the smart device of the vehicle seat occupant.

12. A system for improving the hair and scalp of a vehicle seat occupant by using vehicle cameras, comprising:
a plurality of vehicles, each vehicle including:
a plurality of vehicle seat occupants;
at least one camera located above the hair and scalp of each of the vehicle seat occupants, wherein the at least one camera is configured for imaging the hair and scalp of the vehicle seat occupant;
at least one sensor for recording a sensor signature of each of the vehicle seat occupants;
a CPU operatively connected with:
the at least one camera and the at least one sensor;
a vehicle memory including a user profile for each vehicle seat occupant and a data record of hair and scalp images of each vehicle seat occupant;
an image processor configured to receive the hair and scalp images, timestamp the hair and scalp images and store the hair and scalp images and timestamps of the hair and scalp images in the vehicle memory;
an identity module configured to identify each vehicle seat occupant by matching the sensor signature of each vehicle seat occupant to a sensor signature stored in the user profile of the respective vehicle seat occupant;
a hair and scalp image comparison module configured to compare current hair and scalp images of each vehicle seat occupant with the data record of hair and scalp images of the respective vehicle seat occupant and to detect changes in the hair and scalp images;
a hair and scalp analysis module configured to determine hair and scalp parameters from the changes in the hair and scalp images;
a user interface configured to communicate with each vehicle seat occupant;
an onboard communications module configured for transmitting a data packet including the hair and scalp images, the hair and scalp parameters, the identity and the user profile of each vehicle seat occupant and further configured for receiving treatment recommendations and updates;
a hair and scalp improvement application including:
a transceiver configured to receive the data packet;
an application processor configured to request a search for information related to the changes in the hair and scalp images and the hair and scalp parameters of each vehicle seat occupant;
a hair and scalp analysis processor;
a database including subscriber data;
an application memory configured to store the identity and the user profile of each vehicle seat occupant;
a registration module; and
a treatment recommendation module;

a controller operatively connected to the transceiver, the application processor, the hair and scalp analysis processor, the database, the application memory, the registration module and the treatment recommendation module;

a hair and scalp data artificial intelligence (AI) analytics module configured to receive search requests from the application processor and to form search queries to retrieve information relating to the changes in the hair and scalp images and the parameters, hair and scalp treatment options and hair care and scalp care products;

a data lake configured to receive the search queries, search unstructured data and structured data for the information and to transmit the information to the hair and scalp data artificial intelligence (AI) analytics module;

wherein the hair and scalp data artificial intelligence (AI) analytics module is further configured to receive the information, analyze the matches to determine a hair and scalp condition, treatment options for the hair and scalp condition and hair and scalp care product information related to the hair and scalp condition and transmit the analysis to the hair and scalp analysis processor;

wherein the hair and scalp analysis processor is configured to correlate the hair and scalp condition, treatment options for the hair and scalp condition and hair and scalp care product information with the user profile of each vehicle seat occupant;

wherein the treatment recommendation module is configured to generate a hair and scalp treatment recommendation for each vehicle seat occupant;

wherein the transceiver is configured to transmit the hair and scalp treatment recommendation of each vehicle seat occupant to the onboard communications module of the vehicle; and wherein the CPU provides the hair and scalp treatment recommendation to the respective vehicle seat occupant of the vehicle and updates the vehicle memory.

13. The system of claim 12, wherein the hair and scalp treatment recommendation comprises recommending at least one of:
a medical practitioner based on a home location or a current location of the vehicle seat occupant;
a hair and scalp professional based on the home location or the current location of the vehicle seat occupant;
a hair and scalp restoration center based on the home location or the current location of the vehicle seat occupant;
hair improvement products;
scalp improvement products;
retail websites of hair or scalp improvement products;
retail outlets for hair or scalp improvement products based on the home location or the current location of the vehicle seat occupant;
a dermatologist;
a hair loss professional;
soothing music for reducing stress; and
at least one of a hair improvement regime and a scalp improvement regime.

14. The system of claim 12, further comprising:
wherein the registration module is configured to register each of the plurality of vehicles with the hair and scalp improvement application;
wherein the application memory includes:
a first database of subscriber information, the subscriber information including the user profile for each vehicle seat occupant, the user profile including a facial image, an age, a height, hair and scalp conditions, a gender, an ethnic group, an address, a credit card number and any medical diseases of each respective vehicle seat occupant; and
a second database including preference lists of medical practitioners, dermatologists, hair loss professionals, hair restoration centers and scalp care professionals and retail outlets for each respective vehicle seat occupant; and
wherein the hair and scalp analysis processor is further configured to correlate the subscriber information and preference lists with the hair and scalp related information in determining the hair and scalp treatment recommendation of each respective vehicle seat occupant.

15. The system of claim 12,
wherein the registration module is further configured to:
register a smart device of the vehicle seat occupant travelling in any one of the plurality of vehicles with the hair and scalp improvement application by receiving a public key from the smart device;
receive the user profile of the vehicle seat occupant, the user profile including a facial image, an age, a height, hair and scalp conditions, a gender, an ethnic group, an address, a credit card number and any medical diseases of the vehicle seat occupant; and
receive lists of preferred medical practitioners, dermatologists, hair loss professionals, hair restoration centers and scalp care professionals and retail outlets of the vehicle seat occupant; and
store the public key, user profile and lists in a subscriber database.

16. The system of claim 15, comprising:
wherein the transceiver is further configured to receive the data packet including the hair and scalp images and the hair and scalp parameters of the registered vehicle seat occupant from the onboard communication module of the respective vehicle, transmit the search queries to the data lake, transmit the information to the hair and scalp data artificial intelligence (AI) analytics module, transmit the analysis to the hair and scalp analysis processor, and transmit the hair and scalp treatment recommendation to the smart device of the vehicle seat occupant.

17. The system of claim 12, wherein the data lake is further configured to store the hair and scalp images, the changes in hair and scalp parameters, the hair and scalp information and the hair and scalp treatment recommendations of each of the respective vehicle seat occupants of each of the plurality of vehicles.

18. The system of claim 12, further comprising a camera module located above the hair and scalp of each vehicle seat occupant, the camera module including:
an array of cameras, the array of cameras including at least one of a visible light camera, a near infrared camera and a scanning camera;
at least one light source;
a housing shaped to hold the array of cameras and the at least one light source in a configuration which directs a field of view of each camera to a different area of the hair and scalp of the vehicle seat occupant;
wherein the CPU is configured to actuate each camera and an associated light source sequentially to image each different area of the hair and scalp of the vehicle seat occupant; and
wherein the image processor is configured to stitch the images together and generate a composite picture of the hair and scalp.

19. A non-transitory computer readable medium having instructions stored therein that, when executed by one or more processor, cause the one or more processors to perform a method for improving the hair and scalp of a vehicle seat occupant using vehicle cameras, comprising:

imaging the hair and scalp of a vehicle seat occupant by at least one vehicle camera each time the vehicle seat occupant sits in a seat of the vehicle;
 storing the images with timestamps of the images;
 comparing each current image with at least one stored image having an earlier timestamp;
 detecting changes between the current image and the at least one stored image having an earlier timestamp;
 determining hair and scalp parameters related to the changes;
 accessing hair and scalp data related to the parameters;
 analyzing the hair and scalp data;
 accessing hair and scalp treatment options based on the analysis;
 accessing hair care and scalp care product information based on the analysis;
 determining a hair and scalp treatment recommendation including the changes in the hair and scalp images, the hair and scalp parameters, the treatment options and the hair and scalp product information;
 updating a memory of the vehicle;
 notifying the vehicle seat occupant of the hair and scalp treatment recommendation; and
 transmitting the hair and scalp images and hair and scalp parameters to a data lake.

20. The non-transitory computer readable medium method of claim 19, further comprising:

registering the vehicle with a hair and scalp improvement application by creating a set of public and private pair keys in a vehicle computing system of the vehicle;
 transmitting the public pair key to the hair and scalp improvement application;
 creating a user profile for each vehicle seat occupant including a facial image, an age, a height, hair and scalp conditions, a gender, an ethnic group, an address, a credit card number and any medical diseases of the vehicle seat occupant; and
 providing lists of preferred medical practitioners, dermatologists, hair loss professionals, hair restoration centers and scalp care professionals and retail outlets for each vehicle seat occupant;
 wherein accessing hair and scalp data related to the parameters, analyzing the hair and scalp data, accessing treatment options based on the analysis; accessing hair care and scalp care product information based on the analysis, determining the hair and scalp treatment recommendation including the changes in the hair and scalp images, the hair and scalp parameters, the treatment options and the hair and scalp product information and notifying the vehicle seat occupant of the hair and scalp treatment recommendation further comprises:
 transmitting the hair and scalp images and hair and scalp parameters of the vehicle seat occupant to the hair and scalp improvement application by an onboard communications system of the vehicle;
 receiving, by the hair and scalp improvement application, the hair and scalp images and hair and scalp parameters of the vehicle seat occupant;
 requesting, by the hair and scalp improvement application, a search of the data lake for hair and scalp data related to the hair and scalp images, the changes and the parameters;
 receiving the request by a hair and scalp data artificial intelligence (AI) analytics module;
 querying, by the hair and scalp data artificial intelligence (AI) analytics module, the data lake for information relating to the hair and scalp images, the changes and the parameters, hair and scalp treatment options and hair care and scalp care product information;
 searching, within the data lake, unstructured data and structured databases for matches to the query;
 receiving, by the hair and scalp data artificial intelligence (AI) analytics module, the matches to the query;
 analyzing, by the hair and scalp data artificial intelligence (AI) analytics module, the matches to determine hair and scalp conditions, treatment options for the hair and scalp conditions and hair and scalp care product information related to the hair and scalp conditions;
 receiving, by the hair and scalp analysis application, the hair and scalp conditions, the treatment options and the hair and scalp care product information;
 generating a hair and scalp treatment recommendation by correlating the hair and scalp conditions, the treatment options and the hair and scalp care product information with the user profile of the vehicle seat occupant;
 transmitting the hair and scalp treatment recommendation to the onboard communications module of the vehicle;
 and providing the hair and scalp treatment recommendation to the vehicle seat occupant.

\* \* \* \* \*